(12) United States Patent
Han et al.

(10) Patent No.: US 12,346,191 B2
(45) Date of Patent: Jul. 1, 2025

(54) METHODS, SYSTEMS, ARTICLES OF MANUFACTURE, AND APPARATUS TO DYNAMICALLY SCHEDULE A WAKE PATTERN IN A COMPUTING SYSTEM

(71) Applicant: Intel Corporation, Santa Clara, CA (US)

(72) Inventors: Hemin Han, Shanghai (CN); Ke Han, Shanghai (CN); Lili Ma, Shanghai (CN); Mengchun Lv, Shanghai (CN); Shouwei Sun, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/928,595

(22) PCT Filed: Jun. 26, 2020

(86) PCT No.: PCT/CN2020/098326
§ 371 (c)(1),
(2) Date: Nov. 29, 2022

(87) PCT Pub. No.: WO2021/258395
PCT Pub. Date: Dec. 30, 2021

(65) Prior Publication Data
US 2023/0205307 A1 Jun. 29, 2023

(51) Int. Cl.
*G06F 1/3296* (2019.01)
*G06F 1/3231* (2019.01)

(52) U.S. Cl.
CPC .......... *G06F 1/3296* (2013.01); *G06F 1/3231* (2013.01)

(58) Field of Classification Search
CPC ............................. G06F 1/3296; G06F 1/3206
See application file for complete search history.

(56) References Cited

U.S. PATENT DOCUMENTS

| 3,581,974 A | 6/1971 | Freeman |
| D324,036 S | 2/1992 | Wakasa |
| (Continued) | | |

FOREIGN PATENT DOCUMENTS

| CN | 1089584 A | * 7/1994 | ......... C04B 24/2641 |
| CN | 102197349 A | 9/2011 | |
| (Continued) | | | |

OTHER PUBLICATIONS

United States Patent and Trademark Office, "Notice of Allowance and Fee(s) Due", issued in connection with U.S. Appl. No. 16/728,899, dated Apr. 3, 2023, 10 pages.

(Continued)

*Primary Examiner* — Jaweed A Abbaszadeh
*Assistant Examiner* — Hyun Soo Kim
(74) *Attorney, Agent, or Firm* — HANLEY, FLIGHT & ZIMMERMAN, LLC

(57) ABSTRACT

Methods, apparatus, systems and articles of manufacture are disclosed to dynamically schedule a wake pattern in a computing system. An example apparatus includes a device state controller to determine contexts of a device based on sensor measurements collected at a first time, an associator to associate a state of an operating system with the contexts of the device, the state obtained at a second time after the first time, a training controller to generate a prediction model based on the association, the prediction model to predict a third time when the state of the operating system will be active based on the contexts, and a schedule controller to reduce power consumption of the device by triggering a wake event before the third time, the wake event to prepare the device for exiting an inactive state.

15 Claims, 7 Drawing Sheets

(56) References Cited

U.S. PATENT DOCUMENTS

| | | | |
|---|---|---|---|
| 5,173,940 A | 12/1992 | Lantz et al. |
| D359,275 S | 6/1995 | Yamazaki |
| 5,519,084 A | 5/1996 | Pak-Harvey |
| D376,791 S | 12/1996 | Schreiner |
| D388,774 S | 1/1998 | Giuntoli |
| D389,129 S | 1/1998 | Guintoli |
| 5,835,083 A | 11/1998 | Nielsen et al. |
| D433,024 S | 10/2000 | Oross |
| D434,773 S | 12/2000 | Suzuki |
| D434,774 S | 12/2000 | Alo et al. |
| D444,462 S | 7/2001 | Tsuji |
| D449,307 S | 10/2001 | Amano et al. |
| D453,508 S | 2/2002 | Shibata |
| D454,126 S | 3/2002 | Bliven et al. |
| D462,967 S | 9/2002 | Suzuki |
| 6,591,198 B1 | 7/2003 | Pratt |
| D478,089 S | 8/2003 | Yokota |
| D480,089 S | 9/2003 | Skinner et al. |
| 6,657,647 B1 | 12/2003 | Bright |
| 6,760,649 B2 | 7/2004 | Cohen |
| D494,161 S | 8/2004 | Sawaguchi |
| D495,692 S | 9/2004 | Whitehorn et al. |
| D504,129 S | 4/2005 | Loew et al. |
| D517,542 S | 3/2006 | Lee et al. |
| D518,042 S | 3/2006 | Kanayama |
| D534,531 S | 1/2007 | Ogasawara |
| 7,386,799 B1 | 6/2008 | Clanton et al. |
| D577,013 S | 9/2008 | Harris et al. |
| D591,737 S | 5/2009 | Morooka et al. |
| 7,559,034 B1 | 7/2009 | Paperny et al. |
| D607,449 S | 1/2010 | Morisawa |
| D608,380 S | 1/2010 | Nagase et al. |
| D611,043 S | 3/2010 | Andre et al. |
| D611,045 S | 3/2010 | Andre et al. |
| D612,830 S | 3/2010 | Kim et al. |
| D614,180 S | 4/2010 | Gou |
| D616,433 S | 5/2010 | Morishita et al. |
| 7,725,547 B2 | 5/2010 | Albertson et al. |
| D616,882 S | 6/2010 | Denhez et al. |
| D617,789 S | 6/2010 | Akana et al. |
| D631,039 S | 1/2011 | Sakai et al. |
| D631,069 S | 1/2011 | Ford et al. |
| 7,971,156 B2 | 6/2011 | Albertson et al. |
| 7,974,743 B2 | 7/2011 | Nakashima |
| D645,857 S | 9/2011 | Cho et al. |
| 8,139,032 B2 | 3/2012 | Su et al. |
| D659,134 S | 5/2012 | Ahn et al. |
| D664,532 S | 7/2012 | Lee |
| D672,765 S | 12/2012 | Masui et al. |
| D673,558 S | 1/2013 | Cruz et al. |
| D674,382 S | 1/2013 | Andre et al. |
| D684,570 S | 6/2013 | Akana et al. |
| D687,831 S | 8/2013 | Kim |
| 8,566,696 B1 | 10/2013 | Hamon et al. |
| D692,875 S | 11/2013 | Lawrence |
| 8,581,974 B2 | 11/2013 | Lin et al. |
| D698,348 S | 1/2014 | Ilchan et al. |
| D704,185 S | 5/2014 | Bowers et al. |
| 8,717,318 B2 | 5/2014 | Anderson et al. |
| D706,767 S | 6/2014 | Kawai et al. |
| D706,768 S | 6/2014 | Kawai |
| D706,769 S | 6/2014 | Kawai et al. |
| D706,772 S | 6/2014 | Koyama et al. |
| D708,178 S | 7/2014 | Honda et al. |
| D708,179 S | 7/2014 | Andre et al. |
| D709,491 S | 7/2014 | Kurimoto et al. |
| 8,812,831 B2 | 8/2014 | Cheng et al. |
| D712,971 S | 9/2014 | Huang |
| D715,793 S | 10/2014 | Tsao et al. |
| D716,795 S | 11/2014 | Huang et al. |
| D717,593 S | 11/2014 | Bond |
| D718,818 S | 12/2014 | Sumii et al. |
| D720,712 S | 1/2015 | Park et al. |
| 8,954,884 B1 | 2/2015 | Barger |
| D724,576 S | 3/2015 | Wolff et al. |
| 8,994,847 B2 | 3/2015 | Chen et al. |
| D727,314 S | 4/2015 | Fukuoka |
| D729,227 S | 5/2015 | Fukuoka |
| D729,228 S | 5/2015 | Kawai |
| D729,229 S | 5/2015 | Kurimoto et al. |
| D729,791 S | 5/2015 | Adamson et al. |
| D729,792 S | 5/2015 | Kurimoto et al. |
| D731,475 S | 6/2015 | Mehandjiysky et al. |
| D739,398 S | 9/2015 | Adamson et al. |
| D739,399 S | 9/2015 | Adamson et al. |
| D739,400 S | 9/2015 | Adamson et al. |
| D740,278 S | 10/2015 | Bowers et al. |
| D741,318 S | 10/2015 | Oakley |
| 9,183,845 B1 | 11/2015 | Gopalakrishnan |
| D746,809 S | 1/2016 | Takada et al. |
| 9,268,434 B2 | 2/2016 | Sultenfuss et al. |
| D751,062 S | 3/2016 | Chang |
| 9,310,559 B2 | 4/2016 | Macnamara |
| 9,311,909 B2 | 4/2016 | Giaimo, III et al. |
| 9,436,241 B2 | 9/2016 | Tang et al. |
| D769,251 S | 10/2016 | Chen |
| D771,684 S | 11/2016 | Kim |
| D780,173 S | 2/2017 | Matsuoka |
| 9,575,559 B2 | 2/2017 | Andrysco |
| D780,760 S | 3/2017 | Ironmonger et al. |
| D788,767 S | 6/2017 | Magi |
| D794,027 S | 8/2017 | Ironmonger et al. |
| 9,721,383 B1 | 8/2017 | Horowitz et al. |
| 9,740,290 B2 | 8/2017 | Rosenberg et al. |
| 9,766,700 B2 | 9/2017 | Lyons et al. |
| 9,785,234 B2 | 10/2017 | Horesh |
| D801,945 S | 11/2017 | Cho et al. |
| D803,946 S | 11/2017 | Matsuda |
| 9,846,471 B1 | 12/2017 | Arora |
| D810,069 S | 2/2018 | Hishiki |
| D810,071 S | 2/2018 | Hishiki |
| D813,235 S | 3/2018 | Rosenberg et al. |
| D814,469 S | 4/2018 | Rundberg |
| D816,083 S | 4/2018 | Wu |
| 9,936,195 B2 | 4/2018 | Horesh |
| D820,827 S | 6/2018 | Seoc et al. |
| 9,996,638 B1 | 6/2018 | Holz et al. |
| D823,850 S | 7/2018 | Lim et al. |
| 10,027,662 B1 | 7/2018 | Mutagi et al. |
| D825,435 S | 8/2018 | Yu |
| 10,101,817 B2 | 10/2018 | Hsin et al. |
| 10,234,928 B2 | 3/2019 | Chen |
| 10,240,389 B2 | 3/2019 | Do |
| 10,254,178 B2 | 4/2019 | Carbone et al. |
| 10,262,599 B2 | 4/2019 | Lang et al. |
| 10,304,209 B2 | 5/2019 | Alonso |
| 10,415,286 B1 | 9/2019 | Porcella et al. |
| D867,460 S | 11/2019 | Yan et al. |
| D873,835 S | 1/2020 | Chan |
| 10,551,888 B1 | 2/2020 | North et al. |
| D878,475 S | 3/2020 | Jetter |
| D879,777 S | 3/2020 | Cho |
| 10,620,457 B2 | 4/2020 | Ain-Kedem |
| 10,620,786 B2 | 4/2020 | Veeramani et al. |
| D886,112 S | 6/2020 | Yeh et al. |
| D891,423 S | 7/2020 | Seoc et al. |
| 10,725,510 B2 | 7/2020 | Ho et al. |
| 10,740,912 B2 | 8/2020 | Ren et al. |
| 10,768,724 B1 | 9/2020 | Han |
| 10,819,920 B1 | 10/2020 | Hamlin et al. |
| 10,884,479 B2 | 1/2021 | Chen |
| D914,010 S | 3/2021 | Yeh et al. |
| D914,021 S | 3/2021 | Magi et al. |
| D916,076 S | 4/2021 | Seoc et al. |
| D916,078 S | 4/2021 | Akana et al. |
| 11,153,472 B2 | 10/2021 | Konicek |
| D934,856 S | 11/2021 | Yeh et al. |
| 11,194,398 B2 | 12/2021 | Bernhart |
| 11,360,528 B2 | 6/2022 | Mishra et al. |
| 11,379,016 B2 | 7/2022 | Cooper et al. |
| 11,543,873 B2 | 1/2023 | Sengupta et al. |
| D982,575 S | 4/2023 | Bae et al. |
| D982,576 S | 4/2023 | Bae et al. |
| 11,733,761 B2 | 8/2023 | Sinah et al. |

(56) References Cited

U.S. PATENT DOCUMENTS

| | | |
|---|---|---|
| 11,782,488 B2 | 10/2023 | Cooper et al. |
| 11,809,535 B2 | 11/2023 | Magi et al. |
| D1,011,342 S | 1/2024 | Shi et al. |
| 2002/0089190 A1 | 7/2002 | Wang et al. |
| 2002/0091738 A1 | 7/2002 | Rohrabaugh et al. |
| 2003/0043174 A1 | 3/2003 | Hinckley et al. |
| 2003/0174149 A1 | 9/2003 | Fujisaki et al. |
| 2004/0120113 A1 | 6/2004 | Rapaich |
| 2004/0158739 A1 | 8/2004 | Wakai et al. |
| 2004/0175020 A1 | 9/2004 | Bradski et al. |
| 2004/0252101 A1 | 12/2004 | Wilk |
| 2005/0071698 A1 | 3/2005 | Kangas |
| 2005/0094823 A1 | 5/2005 | Kobori |
| 2006/0146030 A1 | 7/2006 | Kim |
| 2006/0192775 A1 | 8/2006 | Nicholson et al. |
| 2007/0027580 A1 | 2/2007 | Ligtenberg et al. |
| 2007/0228138 A1 | 10/2007 | Huang et al. |
| 2008/0046425 A1 | 2/2008 | Perski |
| 2008/0112571 A1 | 5/2008 | Bradicich et al. |
| 2008/0158144 A1 | 7/2008 | Schobben et al. |
| 2008/0301300 A1 | 12/2008 | Toub |
| 2009/0092261 A1 | 4/2009 | Bard |
| 2009/0092262 A1 | 4/2009 | Costa |
| 2009/0092293 A1 | 4/2009 | Lin |
| 2009/0165125 A1 | 6/2009 | Brown et al. |
| 2010/0039376 A1 | 2/2010 | Wang |
| 2010/0079508 A1 | 4/2010 | Hodge et al. |
| 2010/0100716 A1 | 4/2010 | Scott et al. |
| 2010/0281432 A1 | 11/2010 | Geisner et al. |
| 2010/0295839 A1 | 11/2010 | Nagaya et al. |
| 2011/0035606 A1 | 2/2011 | Lovicott et al. |
| 2011/0055752 A1 | 3/2011 | Rubinstein et al. |
| 2011/0154266 A1 | 6/2011 | Friend et al. |
| 2011/0175932 A1 | 7/2011 | Yu et al. |
| 2011/0248918 A1 | 10/2011 | Yoo et al. |
| 2011/0251733 A1 | 10/2011 | Atkinson et al. |
| 2011/0252339 A1 | 10/2011 | Lemonik et al. |
| 2011/0273546 A1 | 11/2011 | Lin et al. |
| 2011/0284918 A1 | 11/2011 | Behres et al. |
| 2011/0296163 A1 | 12/2011 | Abernethy et al. |
| 2011/0298702 A1 | 12/2011 | Sakata et al. |
| 2011/0298967 A1 | 12/2011 | Clavin et al. |
| 2011/0302535 A1 | 12/2011 | Clerc et al. |
| 2012/0006342 A1 | 1/2012 | Rose et al. |
| 2012/0032894 A1 | 2/2012 | Parivar et al. |
| 2012/0054670 A1 | 3/2012 | Rainisto |
| 2012/0062470 A1 | 3/2012 | Chang |
| 2012/0123680 A1 | 5/2012 | Wipplinger et al. |
| 2012/0171656 A1 | 7/2012 | Shen |
| 2012/0172085 A1 | 7/2012 | Vuppu et al. |
| 2012/0249429 A1 | 10/2012 | Anderson et al. |
| 2012/0268893 A1 | 10/2012 | Yin |
| 2012/0300061 A1 | 11/2012 | Osman et al. |
| 2012/0319997 A1 | 12/2012 | Majumder |
| 2013/0007096 A1 | 1/2013 | Pahlavan et al. |
| 2013/0007590 A1 | 1/2013 | Rivera et al. |
| 2013/0021265 A1 | 1/2013 | Selim |
| 2013/0021750 A1 | 1/2013 | Senatori |
| 2013/0080807 A1 | 3/2013 | Theocharous et al. |
| 2013/0120460 A1 | 5/2013 | Adams et al. |
| 2013/0158999 A1 | 6/2013 | Maruta et al. |
| 2013/0173946 A1 | 7/2013 | Rotem et al. |
| 2013/0174016 A1 | 7/2013 | Glazer et al. |
| 2013/0185633 A1 | 7/2013 | Bunker et al. |
| 2013/0207895 A1 | 8/2013 | Lee et al. |
| 2013/0212462 A1 | 8/2013 | Athas et al. |
| 2013/0222329 A1 | 8/2013 | Larsby et al. |
| 2013/0283213 A1 | 10/2013 | Guendelman et al. |
| 2013/0289782 A1 | 10/2013 | Giroti |
| 2013/0289792 A1 | 10/2013 | Cheng et al. |
| 2013/0321265 A1 | 12/2013 | Bychkov et al. |
| 2013/0321271 A1 | 12/2013 | Bychkov et al. |
| 2013/0332760 A1 | 12/2013 | Reece et al. |
| 2013/0337976 A1 | 12/2013 | Yanev |
| 2014/0006830 A1 | 1/2014 | Kamhi et al. |
| 2014/0028548 A1 | 1/2014 | Bychkov et al. |
| 2014/0050360 A1 | 2/2014 | Lin et al. |
| 2014/0085451 A1 | 3/2014 | Kamimura et al. |
| 2014/0089865 A1 | 3/2014 | Gay et al. |
| 2014/0094973 A1 | 4/2014 | Giaimo, III |
| 2014/0129937 A1 | 5/2014 | Jarvinen et al. |
| 2014/0132508 A1 | 5/2014 | Hodge et al. |
| 2014/0132514 A1 | 5/2014 | Kuzara |
| 2014/0139456 A1 | 5/2014 | Wigdor et al. |
| 2014/0149935 A1 | 5/2014 | Johnson et al. |
| 2014/0177843 A1 | 6/2014 | Kuo |
| 2014/0189579 A1 | 7/2014 | Rimon et al. |
| 2014/0191995 A1 | 7/2014 | Karpin et al. |
| 2014/0201690 A1 | 7/2014 | Holz |
| 2014/0208260 A1 | 7/2014 | Kawahara et al. |
| 2014/0258942 A1 | 9/2014 | Kutliroff et al. |
| 2014/0267021 A1 | 9/2014 | Lee et al. |
| 2014/0267034 A1 | 9/2014 | Krulce et al. |
| 2014/0281918 A1 | 9/2014 | Wei et al. |
| 2014/0313120 A1 | 10/2014 | Kamhi |
| 2014/0344599 A1 | 11/2014 | Branover et al. |
| 2014/0347326 A1 | 11/2014 | Yim |
| 2014/0361977 A1 | 12/2014 | Stafford et al. |
| 2014/0372511 A1 | 12/2014 | Kapadia et al. |
| 2014/0379340 A1 | 12/2014 | Timem et al. |
| 2014/0380075 A1 | 12/2014 | Pulapaka et al. |
| 2015/0009238 A1 | 1/2015 | Kudalkar |
| 2015/0015688 A1 | 1/2015 | Yang |
| 2015/0042572 A1 | 2/2015 | Lombardi et al. |
| 2015/0058649 A1 | 2/2015 | Song et al. |
| 2015/0100884 A1 | 4/2015 | Ryu et al. |
| 2015/0121193 A1 | 4/2015 | Beveridge et al. |
| 2015/0121287 A1 | 4/2015 | Fermon |
| 2015/0177843 A1 | 6/2015 | Kwon |
| 2015/0185909 A1 | 7/2015 | Gecnuk |
| 2015/0193395 A1 | 7/2015 | Nicolaou et al. |
| 2015/0198991 A1* | 7/2015 | Bircher ............... G06F 1/329 |
| | | 713/323 |
| 2015/0220149 A1 | 8/2015 | Plagemann et al. |
| 2015/0220150 A1 | 8/2015 | Plagemann et al. |
| 2015/0248167 A1 | 9/2015 | Turbell et al. |
| 2015/0264572 A1 | 9/2015 | Turgeman |
| 2015/0271729 A1* | 9/2015 | Sirotkin ............. H04W 36/302 |
| | | 370/332 |
| 2015/0360567 A1 | 12/2015 | Sannomiya et al. |
| 2015/0363070 A1 | 12/2015 | Katz |
| 2015/0378443 A1 | 12/2015 | Luo |
| 2015/0378748 A1 | 12/2015 | Cheng et al. |
| 2016/0013745 A1 | 1/2016 | North |
| 2016/0034019 A1 | 2/2016 | Seo et al. |
| 2016/0047609 A1 | 2/2016 | Gauthier |
| 2016/0055825 A1* | 2/2016 | Lee ...................... G01H 3/10 |
| | | 345/207 |
| 2016/0062584 A1 | 3/2016 | Cohen et al. |
| 2016/0087981 A1 | 3/2016 | Dorresteijn |
| 2016/0091938 A1 | 3/2016 | Edwards et al. |
| 2016/0109961 A1 | 4/2016 | Parshionikar |
| 2016/0116960 A1 | 4/2016 | Kwak et al. |
| 2016/0132099 A1 | 5/2016 | Grabau et al. |
| 2016/0165544 A1 | 6/2016 | Pefkianakis et al. |
| 2016/0170617 A1 | 6/2016 | Shi et al. |
| 2016/0179767 A1 | 6/2016 | Mavinakuli et al. |
| 2016/0180762 A1 | 6/2016 | Bathiche et al. |
| 2016/0187994 A1 | 6/2016 | La et al. |
| 2016/0202750 A1 | 7/2016 | Pulapaka et al. |
| 2016/0212317 A1 | 7/2016 | Alameh et al. |
| 2016/0232701 A1 | 8/2016 | Drozdyuk |
| 2016/0238014 A1 | 8/2016 | Liu |
| 2016/0259467 A1 | 9/2016 | Nayyar et al. |
| 2016/0297362 A1 | 10/2016 | Tijerina et al. |
| 2016/0335989 A1 | 11/2016 | Ooi et al. |
| 2016/0370860 A1 | 12/2016 | Bychkov et al. |
| 2017/0010654 A1 | 1/2017 | Chen |
| 2017/0018234 A1 | 1/2017 | Na et al. |
| 2017/0028548 A1 | 2/2017 | Nagano |
| 2017/0034146 A1 | 2/2017 | Sugaya |
| 2017/0039170 A1 | 2/2017 | Tunali et al. |
| 2017/0039480 A1 | 2/2017 | Bitran et al. |
| 2017/0045936 A1 | 2/2017 | Kakapuri |

(56) References Cited

U.S. PATENT DOCUMENTS

| | | |
|---|---|---|
| 2017/0075479 A1 | 3/2017 | Tsukamoto |
| 2017/0085790 A1 | 3/2017 | Bohn |
| 2017/0090585 A1 | 3/2017 | Bernhart |
| 2017/0147879 A1 | 5/2017 | Alameh et al. |
| 2017/0201254 A1 | 7/2017 | Hanssen et al. |
| 2017/0208523 A1* | 7/2017 | Yang .................. H04W 76/28 |
| 2017/0219240 A1 | 8/2017 | Cassini et al. |
| 2017/0269725 A1 | 9/2017 | Kang |
| 2017/0321856 A1 | 11/2017 | Keates |
| 2018/0029370 A1 | 2/2018 | Fujikawa |
| 2018/0039410 A1 | 2/2018 | Kim et al. |
| 2018/0039990 A1 | 2/2018 | Lindemann |
| 2018/0136719 A1 | 5/2018 | Chen |
| 2018/0137267 A1 | 5/2018 | Krieger et al. |
| 2018/0141092 A1 | 5/2018 | Davies |
| 2018/0157815 A1 | 6/2018 | Salama et al. |
| 2018/0164942 A1 | 6/2018 | Huffman et al. |
| 2018/0166076 A1 | 6/2018 | Higuchi et al. |
| 2018/0188774 A1 | 7/2018 | Ent et al. |
| 2018/0188803 A1 | 7/2018 | Sharma et al. |
| 2018/0189547 A1 | 7/2018 | Daniels et al. |
| 2018/0224871 A1 | 8/2018 | Sahu et al. |
| 2018/0321731 A1 | 11/2018 | Alfano et al. |
| 2018/0373292 A1 | 12/2018 | Perelli |
| 2019/0004764 A1 | 1/2019 | Son et al. |
| 2019/0027930 A1 | 1/2019 | Balpe et al. |
| 2019/0034609 A1 | 1/2019 | Yang et al. |
| 2019/0079572 A1 | 3/2019 | Yamamoto |
| 2019/0129473 A1 | 5/2019 | Hu et al. |
| 2019/0147875 A1 | 5/2019 | Stemmer et al. |
| 2019/0155364 A1 | 5/2019 | Chen |
| 2019/0155368 A1 | 5/2019 | Branover |
| 2019/0174419 A1 | 6/2019 | Schillings et al. |
| 2019/0213309 A1 | 7/2019 | Morestin |
| 2019/0236390 A1 | 8/2019 | Guo et al. |
| 2019/0239384 A1 | 8/2019 | North et al. |
| 2019/0250691 A1 | 8/2019 | Lee et al. |
| 2019/0258758 A1 | 8/2019 | Bohbot et al. |
| 2019/0258785 A1 | 8/2019 | Alameh et al. |
| 2019/0265831 A1 | 8/2019 | Sinnott et al. |
| 2019/0278339 A1 | 9/2019 | Cooper et al. |
| 2019/0342447 A1* | 11/2019 | Ko .................. H04M 1/7243 |
| 2019/0361501 A1 | 11/2019 | Park et al. |
| 2019/0364501 A1 | 11/2019 | Kwon et al. |
| 2019/0371326 A1 | 12/2019 | Bocklet et al. |
| 2019/0371342 A1* | 12/2019 | Tukka ............... H04W 52/0229 |
| 2020/0012331 A1 | 1/2020 | de Cesare et al. |
| 2020/0026342 A1 | 1/2020 | Sengupta et al. |
| 2020/0026896 A1 | 1/2020 | Debates |
| 2020/0033920 A1 | 1/2020 | Nielsen et al. |
| 2020/0092817 A1* | 3/2020 | Bai .................. H04W 52/0264 |
| 2020/0125158 A1 | 4/2020 | Giusti et al. |
| 2020/0125179 A1 | 4/2020 | Okuley |
| 2020/0133358 A1 | 4/2020 | Mishra et al. |
| 2020/0133374 A1 | 4/2020 | Sinha et al. |
| 2020/0134151 A1 | 4/2020 | Magi et al. |
| 2020/0142471 A1 | 5/2020 | Azam et al. |
| 2020/0175944 A1 | 6/2020 | Sun et al. |
| 2020/0213501 A1 | 7/2020 | Sohn |
| 2020/0259638 A1 | 8/2020 | Carmignani et al. |
| 2020/0348745 A1 | 11/2020 | Hamlin et al. |
| 2021/0025976 A1 | 1/2021 | Chandel et al. |
| 2021/0092517 A1 | 3/2021 | Kulkarni |
| 2021/0096237 A1 | 4/2021 | Patole et al. |
| 2021/0109585 A1 | 4/2021 | Fleming et al. |
| 2021/0240254 A1 | 8/2021 | Hamlin et al. |
| 2021/0270016 A1 | 9/2021 | Hyodo |
| 2021/0314866 A1* | 10/2021 | Lee .................. H04W 76/28 |
| 2021/0318743 A1 | 10/2021 | Partiwala et al. |
| 2021/0327394 A1 | 10/2021 | Bui et al. |
| 2022/0060572 A1 | 2/2022 | Kwon |
| 2022/0147142 A1 | 5/2022 | Bui et al. |
| 2022/0245229 A1 | 8/2022 | Zhang |
| 2022/0334620 A1 | 10/2022 | Cooper et al. |
| 2022/0350385 A1 | 11/2022 | Mishra et al. |

FOREIGN PATENT DOCUMENTS

| | | |
|---|---|---|
| CN | 102231255 A | 11/2011 |
| CN | 102197349 B | 6/2014 |
| CN | 107077184 A | 8/2017 |
| CN | 108958447 A | 12/2018 |
| CN | 112558056 A | 3/2021 |
| CN | 113490904 A | 10/2021 |
| CN | 118805153 A | 10/2024 |
| DE | 112019007085 T5 | 1/2022 |
| EP | 2518586 A1 | 10/2012 |
| EP | 2830366 A1 | 1/2015 |
| EP | 3285133 A1 | 2/2018 |
| EP | 3285133 B1 | 5/2019 |
| EP | 3742255 A1 | 11/2020 |
| EP | 3798797 A1 | 3/2021 |
| EP | 3819745 A1 | 5/2021 |
| EP | 3842971 A1 | 6/2021 |
| EP | 3948492 A1 | 2/2022 |
| EP | 3964984 A1 | 3/2022 |
| JP | H0651901 A | 2/1994 |
| JP | H10240389 A | 9/1998 |
| JP | 2001255854 A | 9/2001 |
| JP | 2002071833 A | 3/2002 |
| JP | 2005221907 A | 8/2005 |
| JP | 2010060746 A | 3/2010 |
| JP | 2010271339 A | 12/2010 |
| JP | 2011137874 A | 7/2011 |
| JP | 2011258204 A | 12/2011 |
| JP | 2012038831 A | 2/2012 |
| JP | 2014067102 A | 4/2014 |
| JP | 2016517087 A | 6/2016 |
| JP | 2020039069 A | 3/2020 |
| JP | 2022534338 A | 7/2022 |
| KR | 1020090079474 A | 7/2009 |
| KR | 1020110083911 A | 7/2011 |
| KR | 20130093962 A | 8/2013 |
| KR | 101471776 B1 | 12/2014 |
| KR | 20140138178 A | 12/2014 |
| KR | 20150022673 A | 3/2015 |
| KR | 101655260 B1 | 9/2016 |
| KR | 20180029370 A | 3/2018 |
| KR | 1020180049299 A | 5/2018 |
| KR | 20190027930 A | 3/2019 |
| KR | 1020190020633 A | 3/2019 |
| KR | 20210139233 A | 11/2021 |
| WO | 2010071631 A1 | 6/2010 |
| WO | 2014086294 A1 | 6/2014 |
| WO | 2014131188 A1 | 9/2014 |
| WO | 2014186294 A1 | 11/2014 |
| WO | 2014205227 A2 | 12/2014 |
| WO | 2015026203 A1 | 2/2015 |
| WO | 2017010654 A1 | 1/2017 |
| WO | 2020191643 A1 | 10/2020 |
| WO | 2021258395 A1 | 12/2021 |
| WO | 2022139895 A1 | 6/2022 |
| WO | 2023184461 A1 | 10/2023 |

OTHER PUBLICATIONS

European Patent Office, "Extended European Search Report," in connection with European Patent Application No. 23154752.2-1224, issued May 4, 2023, 14 pages.

United States Patent and Trademark Office, "Non-Final Rejection" issued in U.S. Appl. No. 17/732,173, mailed on May 30, 2023, 28 pages.

Japanese Patent Office, "Decision of Refusal," issued in connection with Japanese Patent Application No. 2021-538701, dated Jun. 6, 2023, 6 pages. (English Translation Included).

International Bureau, "International Preliminary Report on Patentability," issued in connection with International Application No. PCT/US2021/049649, dated Jun. 13, 2023, 10 pages.

United States Patent and Trademark Office, "Notice of Allowability," issued in connection with U.S. Appl. No. 16/728,899, dated Jun. 22, 2023, 3 pages.

United States Patent and Trademark Office, "Notice of Allowance," issued in connection with U.S. Appl. No. 16/725,467, dated Jun. 29, 2023, 6 pages.

(56) References Cited

OTHER PUBLICATIONS

United States Patent and Trademark Office, "Corrected Notice of Allowability," issued in connection with U.S. Appl. No. 17/856,587, dated Jul. 3, 2023, 2 pages.
United States Patent and Trademark Office, "Final Office Action," issued in connection with U.S. Appl. No. 17/129,465, mailed on Jul. 7, 2023, 15 pages.
European Patent Office, "Communication Pursuant to Article 94(3) EPC," issued in connection with European Patent Application No. 20197337.7-1218, issued on Aug. 10, 2023, 10 pages.
United States Patent and Trademark Office, "Notice of Allowance and Fee(s) Due," issued in connection with U.S. Appl. No. 18/160,419, dated Aug. 23, 2023, 11 pages.
International Searching Authority, "International Search Report," issued in connection with PCT No. PCT/US2021/049649, Sep. 9, 2021, 5 pages.
United States Patent and Trademark Office, "Corrected Notice of Allowance," issued in connection with U.S. Appl. No. 14/866,894, mailed on Sep. 20, 2021, 3 pages.
United States Patent and Trademark Office, "Final Office Action" issued in U.S. Appl. No. 16/728,774 on Sep. 22, 2021, 20 pages.
European Patent Office, "Communication pursuant to Article 94(3) EPC," in connection with European Patent Application No. 20164273.3-1203, issued on Sep. 28, 2021, 9 pages.
Industrial Property Cooperation Center, "Search Report," issued in connection with Japanese Patent Application No. 2021-538701, dated Feb. 15, 2023, 58 pages (English Translation Included).
Taiwan Intellectual Property Office, "Communication regarding deficiency in application documents and invitation to remedy," issued in connection with Taiwanese Patent Application No. 110135154, dated Sep. 29, 2021, 3 Pages (English Translation Included).
United States Patent and Trademark Office, "Non-Final Office Action," issued in connection with U.S. Appl. No. 16/421,217, mailed on Oct. 27, 2021, 29 pages.
United States Patent and Trademark Office, "Non-Final Rejection", issued in connection with U.S. Appl. No. 16/728,899, dated Dec. 8, 2021, 9 pages.
United States Patent and Trademark Office, "Notice of Allowance," issued in connection with U.S. Appl. No. 16/586,225, mailed on Dec. 16, 2021, 3 pages.
International Searching Authority, "International Search Report," issued in connection with PCT No. PCT/US2021/049649, Jan. 14, 2022, 5 Pages.
International Searching Authority, "Written Opinion of the International Searching Authority," issued in connection with PCT No. PCT/US2021/049649, Jan. 14, 2022, 9 pages.
United States Patent and Trademark Office, "Notice of Allowance," issued in U.S. Appl. No. 16/728,774 on Feb. 2, 2022, 9 pages.
United States Patent and Trademark Office, "Notice of Allowance," issued in connection with U.S. Appl. No. 16/421,217, mailed on Mar. 9, 2022, 6 pages.
United States Patent and Trademark Office, "Notice of Allowance," issued in connection with U.S. Appl. No. 16/586,225, mailed on Mar. 16, 2022, 3 pages.
United States Patent and Trademark Office, "Notice of Allowance," issued in connection with U.S. Appl. No. 16/421,217, mailed on Mar. 24, 2022, 3 pages.
International Searching Authority, "International Search Report," issued in connection with PCT No. PCT/ CN2022/084726, Apr. 1, 2022, 4 pages.
United States Patent and Trademark Office, "Non-Final Office Action", issued in connection with U.S. Appl. No. 16/725,467, issued Apr. 7, 2022, 19 Pages.
United States Patent and Trademark Office, "Notice of Allowance," issued in connection with U.S. Appl. No. 16/586,225, mailed on Apr. 29, 2022, 6 pages.
United States Patent and Trademark Office, "Corrected Notice of Allowance," issued in connection with U.S. Appl. No. 16/586,225, mailed on May 18, 2022, 3 pages.
United States Patent and Trademark Office, "Corrected Notice of Allowance," issued in connection with U.S. Appl. No. 16/421,217, mailed on May 27, 2022, 2 pages.
United States Patent and Trademark Office, "Final Rejection," issued in connection with U.S. Appl. No. 16/728,899, dated Jun. 24, 2022, 10 pages.
European Patent Office, "Communication under Rule 71(3) EPC," in connection with European Patent Application No. 20164273.3-1224, issued on Jul. 29, 2022, 5 pages.
United States Patent and Trademark Office, "Final Office Action," issued in connection with U.S. Appl. No. 16/725,467, dated Aug. 18, 2022, 29 pages.
United States Patent and Trademark Office, "Notice of Allowance and Fee(s) Due," issued in connection with U.S. Appl. No. 16/586,225, dated Aug. 31, 2022, 5 pages.
United States Patent and Trademark Office, "Corrected Notice of Allowance," issued in connection with U.S. Appl. No. 16/586,225, dated Sep. 19, 2022, 2 pages.
United States Patent and Trademark Office, "Advisory Action", issued in connection with U.S. Appl. No. 16/728,899, dated Oct. 5, 2022, 2 pages.
European Patent Office, "Extended European Search Report," issued in connection with European Patent Application No. 19921860.3-1224, Oct. 10, 2022, 5 pages.
United States Patent and Trademark Office, "Non-Final Rejection," issued in connection with U.S. Appl. No. 16/728,899, dated Oct. 20, 2022, 9 pages.
United States Patent and Trademark Office, "Corrected Notice of Allowability," issued in connection with U.S. Appl. No. 16/586,225, dated Dec. 7, 2022, 3 pages.
United States Patent and Trademark Office, "Notice of Allowance and Fee(s) Due", issued in connection with U.S. Appl. No. 17/856,587, filed Dec. 9, 2022, 9 pages.
International Bureau, "International Preliminary Report on Patentability," issued in connection with PCT No. PCT/CN2020/098326, Dec. 13, 2022, 5 pages.
European Patent Office, "Communication under Rule 71(3) EPC," in connection with European Patent Application No. 20164273.3-1224, issued on Dec. 23, 2022 , 5 pages.
Intellectual Property India, "Examination Report," issued in connection with Indian patent Application No. 202147037534, dated Dec. 28, 2022, 6 pages.
International Searching Authority, "Written Opinion of the International Searching Authority," issued in connection with PCT No. PCT/CN2022/084726, mailed Jan. 4, 2023, 4 pages.
United States Patent and Trademark Office, "Advisory Action," issued in connection with U.S. Appl. No. 16/725,467, dated Jan. 4, 2023, 4 pages.
International Searching Authority, "International Search Report," issued in connection with PCT Application No. PCT/CN2022/084726 dated Jan. 4, 2023, 4 pages.
International Bureau, "International Preliminary Report on Patentability," issued in connection with International Application No. PCT/CN2020/098326, mailed Jan. 5, 2023, 6 pages.
United States Patent and Trademark Office, "Corrected Notice of Allowability", issued in connection with U.S. Appl. No. 17/856,587, filed Jan. 10, 2023, 2 pages.
European Patent Office, "Communication pursuant to Rule 94(3) EPC," issued in connection with European Patent Application No. 20194494.9-1224, Jan. 24, 2023, 6 pages.
The Netherlands Patent Office, "Office Action," issued in connection with Netherlands Application No. 2029823, issued on Mar. 15, 2023, 14 pages (Written Opinion Provided in English).
United States Patent and Trademark Office, "Final Office Action," issued in connection with U.S. Appl. No. 17/434,603, filed Feb. 8, 2023, 17 pages.
United States Patent and Trademark Office, "Corrected Notice of Allowability," issued in connection with U.S. Appl. No. 17/856,587, filed Feb. 14, 2023, 2 pages.
Japanese Patent Office, "Notice of Reasons for Rejection," issued in connection with Japanese Patent Application No. 2021-538701, dated Feb. 21, 2023, 7 pages (English translation included).

(56) References Cited

OTHER PUBLICATIONS

United States Patent and Trademark Office, "Notice of Allowance and Fee(s) Due," issued in connection with U.S. Appl. No. 16/725,467, dated Feb. 23, 2023, 9 pages.

United States Patent and Trademark Office, "Notice of Allowance and Fees Due (PTOL-85)," issued in connection with U.S. Appl. No. 16/725,467, issued Mar. 1, 2023, 3 Pages.

Notebookreview Staff Reads, "CES 2007: Vista SideShow in HP, Fujitsu, LG and Asus Notebooks," Notebook Review, available at www.notebookreview.com/news/ces-2007-vista-sideshow-in-hp-fujitsu-lg-and-asus-notebooks/ (retrieved May 6, 2019), Jan. 8, 2007, 8 pages.

NVIDIA, "NVIDIA Preface Platform Enables Windows Vista on the Go," Press Release, available at https://www.nvidia.com/object/IO_38775.html (retrieved May 6, 2019), Jan. 8, 2007, 3 pages.

Chin, "Alexa on Windows 10 Hands-On: Useful, with 1 Big Catch," Laptop Magazine, available at https://www.laptopmag.com/articles/alexa-windows-10-hands-on (retrieved May 6, 2019), Nov. 14, 2018, 3 pages.

Chethan, "Proximity Sensing with CapSense," Cypress AN92239, 2016, 62 pages.

United States Patent and Trademark Office, "Non-Final Office Action," issued in connection with U.S. Appl. No. 14/866,894, issued on Dec. 14, 2018, 12 pages.

United States Patent and Trademark Office, "Non-Final Office Action," in connection with U.S. Appl. No. 17/434,603, issued Jul. 5, 2022, 15 pages.

United States Patent and Trademark Office, "Final Office Action," issued in connection with U.S. Appl. No. 14/866,894, issued on Jun. 23, 2020, 17 pages.

Pradeep, "Dell's New Latitude 7400 2-in-I Can Detect Your Presence and Automatically Wake the System, MSPowerUser," available at https://mspowemser.com/dells-new-latitude-7400-2-in-1-can-detect-your-presence-and-automatically-wake-the-system/, Jan. 4, 2019, 8 pages.

Cravotta, Nicholas, "Optimizing Proximity Sensing for Consumer Electronics Applications," Digi-Kev Electronics, Apr. 26, 2012, 9 pages.

United States Patent and Trademark Office, "Advisory Action," issued in connection with U.S. Appl. No. 14/866,894, issued on Nov. 5, 2019, 3 pages.

United States Patent and Trademark Office, "Non-Final Office Action," in connection with U.S. Appl. No. 17/129,465, dated Jan. 5, 2023, 12 pages.

United States Patent and Trademark Office, "Notice of Allowance," issued in connection with U.S. Appl. No. 16/586,225, dated Dec. 8, 2021, 6 pages.

Reads, Brian, "Microsoft Windows Vista SideShow—In-Depth (pics)," Notebook Review, available at www.notebookreview.com/news/microsoft-windows-vista-sideshow-in-depth-pics/ (retreived May 6, 2019), Jan. 11, 2006, 7 pages.

NVIDIA, "NVIDIA and ASUS Deliever World's First Notebook with Windows Sideshow Secondary Display," Press Release, available at https://www.nvidia.com/object/IO_38772.html (retrieved May 6, 2019), Jan. 8, 2007, 5 pages.

NVIDIA, "PDK User's Guide: Preface Personal Media Device," Sep. 4, 2007, 39 pages.

Gajitz, "Open Sesame! Gesture Controlled Motorized Laptop Lid," available at https://gajitz.com/open-sesame-gesture-controlled-motorized-laptop-lid/ (retrieved May 6, 2019), Sep. 2012, 3 pages.

Sanchez et al., "ZSim: Fast and accurate microarchitectural simulation of Thousand-Core systems," ACM SIGARCH Computer architecture news, Jun. 2013, 12 pages.

International Searching Authority, "Written Opinion of the International Searching Authority," issued in connection with PCT Application No. PCT/US2016/048953, dated Nov. 23, 2016, 9 pages.

International Searching Authority, "International Search Report," issued in connection with PCT Application No. PCT/US2016/048953, issued on Nov. 23, 2016, 3 pages.

Popa, "Intel Considering Microsoft Surface Killer with Curved Display," retrieved on Aug. 24, 2020 from https://news.softpedia.com/news/intel-considering-microsoft-surface-killer-with-curved-display-512636.shtml, Feb. 6, 2017, 5 pages.

Purcher, "Google Patents a Motorized Pixelbook Lid that Opens and Closes with a Simple Touch & Auto-Aligns the Display to the user's Face," Patently Mobile, available at https://www.patentmobile.com/2017/11/google-patents-a-motorized-pixelbook-lid-that-opens-and-closes-with-a-simple-touch-auto-aligns-the-displau-to-the-users-fa.html (retrieved May 6, 2019), Nov. 25, 2017, 6 pages.

International Bureau, "International Preliminary Report on Patentability," issued in connection with PCT/US2016/048953, dated Mar. 27, 2018, 10 pages.

Cutress, "Asus Zenbook Pro 15 (UX580): A 5.5-inch Screen in the Touchpad," retrieved from https://www.anandtech/show/12880/asus-zenbook-pro-15-ux580-a-55inch-screen-in-the-touchpad, Jun. 5, 2018, 5 pages.

Bushan, "CES 2019: Dell's new laptop can sense your presence and wake itself," Hindustan Times, available at https://www.hindustantimes.com/tech/ces-2019-dell-latitude-7400-2-in-1-laptop-launched-price-specifications-features/story-CiRoU1GoHHsHq3K3qtPZWJ.html (retrieved May 6, 19), Jan. 5, 2019, 8 pages.

International Bureau, "International Preliminary Report on Patentability," issued in connection with PCT Application No. PCT/CN2019/079790, Mar. 27, 2019, 5 pages.

Gsmarena Team, "Samsung Galaxy Fold review," GSMARENA, retrieved from hllps://www. Jsmarena.com/samsung_galaxy_fold-review-1926p4.php on Jun. 8, 2023, dated Apr. 26, 2019, 8 pages.

Indiegogo, "Cosmo Communicator", available at https://www.indiegogo.com/projects/cosmo-communicator#/(retrieved May 6, 2019), 2018, 18 pages.

United States Patent and Trademark Office, "Final Office Action," issued in connection with U.S. Appl. No. 14/866,894, mailed on Jul. 29, 2019, 18 pages.

Samsung, "Samsung Galaxy Fold Now Available," Samsung Global Newsroom, available at https://news.samsung.com/global/samsung-galaxy-fold-now-available (retrieved on Jun. 8, 2023), dated Sep. 5, 2019, 7 pages.

GSMARENA Team, "Samsung Galaxy Fold long-term review," GSMARENA, available at https://www.gsmarena.com/samsung_galaxy_fold_long_term-review-1996p7.php (retrieved on Jun. 8, 2023), dated Nov. 9, 2019, 8 pages.

International Searching Authority, "Written Opinion," issued in connection with PCT Application No. PCT/CN2019/079790 , dated Jan. 3, 2020, 4 pages.

International Searching Authority, "International Search Report," issued in connection with PCT Application No. PCT/CN2019/079790, Jan. 3, 2020, 2 pages.

United States Patent and Trademark Office, "Non-Final Office Action," issued in connection with U.S. Appl. No. 14/866,894, mailed on Feb. 21, 2020, 17 pages.

United States Patent and Trademark Office, "Advisory Action" issued in connection with U.S. Appl. No. 14/866,894, issued on Aug. 17, 2020, 5 pages.

United States Patent and Trademark Office, "Non-Final Office Action," issued in connection with U.S. Appl. No. 14/866,894, mailed on Oct. 8, 2020, 18 pages.

European Patent Office, " European Search Report," in connection with European Patent Application No. 20164273.3, issued on Oct. 9, 2020, 13 pages.

United States Patent and Trademark Office, "Notice of Allowance," issued in connection with U.S. Appl. No. 29/673,785, mailed on Nov. 16, 2020, 8 pages.

European Patent Office, "Extended European Search Report," issued in connection with European Patent Application No. 20181123.9-1203, Dec. 4, 2020, 8 pages.

European Patent Office, "European Search Report," issued in connection with European patent Application No. 20194494, filed Feb. 17, 2021, 2 pages.

United States Patent and Trademark Office, "Notice of Allowability," issued in connection with U.S. Appl. No. 29/673,785 mailed on Feb. 19, 2021, 2 pages.

(56) References Cited

OTHER PUBLICATIONS

European Patent Office, "Extended European Search Report," issued in connection with European Application No. 20197337.7-1218, Mar. 9, 2021, 10 pages.
International Searching Authority, "International Search Report and Written Opinion," issued in connection with International Application No. PCT/CN2020/098326, mailed Mar. 29, 2021, 8 pages.
United States Patent and Trademark Office, "Non-Final Action" issued in U.S. Appl. No. 16/728,774 on May 3, 2021, 12 pages.
United States Patent and Trademark Office, "Final Office Action," issued in connection with U.S. Appl. No. 14/866,894, mailed on May 11, 2021, 17 pages.
United States Patent and Trademark Office, "Non-Final Office Action," issued in connection with U.S. Appl. No. 16/586,225, mailed on Jun. 15, 2021, 14 pages.
European Patent Office, "European Search Report," issued in connection with European patent application No. 20197335.1, Jul. 16, 2021, 11 pages.
United States Patent and Trademark Office, "Notice of Allowance," issued in connection with U.S. Appl. No. 14/866,894, mailed on Jul. 30, 2021, 8 pages.
International Searching Authority," International Search Report," issued in connection with International Patent Application No. PCT/US2022/022196, mailed on Jun. 30, 2022, 4 pages.
International Searching Authority, "Written Opinion," issued in connection with International Patent Application No. PCT/US2022/022196, mailed on Jun. 30, 2022, 4 pages.
United States Patent and Trademark Office, "Non-Final Office Action," issued in connection with U.S. Appl. No. 17/434,603, mailed on Sep. 7, 2023, 17 pages.
European Patent Office, "Communication Pursuant to Article 94(3) EPC," issued in connection with European Patent Application No. 20197335.1-1224, dated Oct. 5, 2023, 5 pages.
United States Patent and Trademark Office, "Non-Final Office Action," issued in connection with U.S. Appl. No. 29/771,488, mailed on Oct. 11, 2023, 6 pages.
United States Patent and Trademark Office, "Notice of Allowance and Fee(s) Due," issued in connection with U.S. Appl. No. 17/732,173, mailed on Oct. 25, 2023, 8 Pages.
United States Patent and Trademark Office, "Notice of Allowance and Fee(s) Due," issued in connection with U.S. Appl. No. 18/322,270, dated Sep. 16, 2024, 9 pages.
United States Patent and Trademark Office, "Advisory Action," issued in connection with U.S. Appl. No. 18/322,270, dated Jul. 31, 2024, 3 pages.
United States Patent and Trademark Office, "Notice of Allowance and Fee(s) Due," issued in connection with U.S. Appl. No. 18/525,248, dated Aug. 22, 2024, 8 pages.
United States Patent and Trademark Office, "Notice of Allowance and Fee(s) Due," issued in connection with U.S. Appl. No. 17/129,465, dated Aug. 28, 2024, 5 pages.
Japanese Patent Office, "Notice of Reasons for Refusal," issued in connection with Japanese Patent Application No. 2022-572376, dated Jul. 16, 2024, 8 pages. [English language machine translation included.].
United States Patent and Trademark Office, "Notice of Allowability," issued in connection with U.S. Appl. No. 18/525,248, dated Sep. 17, 2024, 2 pages.
International Searching Authority, "International Preliminary Report on Patentability," issued in connection with International Patent Application No. PCT/CN2022/084726, mailed on Oct. 10, 2024, 6 pages.
United States Patent and Trademark Office, "Notice of Allowance and Fee(s) Due," issued in connection with U.S. Appl. No. 18/525,248, dated Nov. 18, 2024, 2 pages.
United States Patent and Trademark Office, "Supplemental Notice of Allowability," issued in connection with U.S. Appl. No. 17/129,465, dated Nov. 20, 2024, 2 pages.

United States Patent and Trademark Office, "Notice of Allowance and Fee(s) Due," issued in connection with U.S. Appl. No. 18/525,248, dated Nov. 29, 2024, 2 pages.
United States Patent and Trademark Office, "Supplemental Notice of Allowability," issued in connection with U.S. Appl. No. 18/322,270, dated Nov. 29, 2024, 2 pages.
European Patent Office, "Communication under Rule 71(3) EPC—Intention to Grant," issued in connection with European Patent Application No. 20 197 337.7, dated Dec. 9, 2024, 9 pages.
Japanese Patent Office, "Written Opinion," issued in connection with Japanese Patent Application No. 2021-538701, dated May 16, 2023, 4 pages. [English language machine translation included.].
European Patent Office, "Communication Under Rule 71(3) EPC," issued in connection with European Patent Application No. 20181123.9, dated Jul. 27, 2023, 5 pages.
Korean Intellectual Property Office, "Request for the Submission of an Opinion," issued in connection with Korean Patent Application No. 10-2021-7027269, dated Jun. 21, 2024, 7 pages. [English language machine translation included.].
United States Patent and Trademark Office, "Corrected Notice of Allowability," issued in connection with U.S. Appl. No. 17/732,173, mailed on Nov. 8, 2023, 2 pages.
United States Patent and Trademark Office, "Notice of Allowance" issued in connection with U.S. Appl. No. 18/160,419, on Dec. 13, 2023, 2 pages.
European Patent Office, "Decision to Grant a European Patent Pursuant to Article 97(1) EPC," issued in connection with European Patent Application No. 20181123.9, dated Dec. 14, 2023, 2 pages.
United States Patent and Trademark Office, "Notice of Allowance and Fee(s) Due," issued in connection with U.S. Appl. No. 17/434,603, mailed on Dec. 26, 2023, 9 pages.
United States Patent and Trademark Office, "Supplemental Notice of Allowability," issued in connection with U.S. Appl. No. 17/434,603, dated Jan. 3, 2024, 3 pages.
United States Patent and Trademark Office, "Non-Final Office Action," issued in connection with U.S. Appl. No. 17/129,465, dated Feb. 1, 2024, 13 pages.
United States Patent and Trademark Office, "Non-Final Office Action," issued in connection with U.S. Appl. No. 18/322,270, dated Feb. 7, 2024, 15 pages.
United States Patent and Trademark Office, "Notice of Allowance and Fee(s) Due," issued in connection with U.S. Appl. No. 29/771,488, dated Feb. 14, 2024, 7 pages.
United States Patent and Trademark Office, "Supplemental Notice of Allowability," issued in connection with U.S. Appl. No. 17/434,603, dated Feb. 22, 2024, 3 pages.
European Patent Office, "Extended European Search Report," issued in connection with European Patent Application No. 20941909.2-1224, dated Feb. 26, 2024, 8 pages.
United States Patent and Trademark Office, "Notice of Allowance and Fee(s) Due," issued in connection with U.S. Appl. No. 17/132,838, dated Mar. 6, 2024, 8 pages.
United States Patent and Trademark Office, "Supplemental Notice of Allowability," issued in connection with U.S. Appl. No. 17/434,603, dated Mar. 6, 2024, 3 pages.
United States Patent and Trademark Office, "Corrected Notice of Allowability," issued in connection with U.S. Appl. No. 17/732,173, dated Mar. 12, 2024, 2 pages.
United States Patent and Trademark Office, "Notice of Allowance and Fee(s) Due," issued in connection with U.S. Appl. No. 29/771,488, dated Apr. 1, 2024, 4 pages.
United States Patent and Trademark Office, "Supplemental Notice of Allowability," issued in connection with U.S. Appl. No. 17/434,603, dated Apr. 4, 2024, 3 pages.
United States Patent and Trademark Office, "Supplemental Notice of Allowability," issued in connection with U.S. Appl. No. 17/434,603, dated Apr. 24, 2024, 3 pages.
European Patent Office, "Communication under Rule 71(3)EPC," issued in connection with European Patent Application No. 23154752.2-1218, dated May 16, 2024, 9 pages.
United States Patent and Trademark Office, "Final Office Action," issued in connection with U.S. Appl. No. 18/322,270, dated May 22, 2024, 18 pages.

(56) References Cited

OTHER PUBLICATIONS

United States Patent and Trademark Office, "Supplemental Notice of Allowability" issued in connection with U.S. Appl. No. 17/434,603, dated May 29, 2024, 3 pages.
European Patent Office, "Communication under Rule 71(3) EPC—Intention to Grant," issued in connection with European Patent Application No. 19 921 860.3-1218, dated Jun. 21, 2024, 9 pages.
European Patent Office, "Communication pursuant to Article 94(3) EPC," issued in connection with European Patent Application No. 20 194 494.9—1218, mailed on Feb. 20, 2025, 7 pages.
Korean Intellectual Property Office, "Written Decision on Registration," issued in connection with Korean Patent Application No. 10-2021-7027269, mailed on Feb. 21, 2025, 3 pages. [English language machine translation.].
United States Patent and Trademark Office, "Non-Final Office Action," issued in connection with U.S. Appl. No. 18/422,948, dated Apr. 7, 2025, 9 pages.
European Patent Office, "Extended European Search Report and Opinion," issued in connection with European Patent Application No. 25153918.5, dated Mar. 31, 2025, 13 pages.
European Patent Office, "Decision to Grant a European Patent Pursuant to Article 97(1) EPC," issued in connection with European Patent Application No. 20197337.7, dated Apr. 3, 2025, 2 pages.

\* cited by examiner

METHODS, SYSTEMS, ARTICLES OF MANUFACTURE, AND APPARATUS TO DYNAMICALLY SCHEDULE A WAKE PATTERN IN A COMPUTING SYSTEM

RELATED APPLICATION

This patent arises from a national stage application of International Application No. PCT/CN2020/098326, which was filed on Jun. 26, 2020. International Application No. PCT/CN2020/098326 is hereby incorporated herein by reference in its entirety. Priority to International Application No. PCT/CN2020/098326 is hereby claimed.

FIELD OF THE DISCLOSURE

This disclosure relates generally to a computing system, and, more particularly, to methods, systems, articles of manufacture, and apparatus that dynamically schedule a wake pattern in a computing system.

BACKGROUND

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) results in output(s) consistent with the recognized patterns and/or associations.

BRIEF DESCRIPTION OF THE DRAWINGS

The figures are not to scale. In general, the same reference numbers will be used throughout the drawing(s) and accompanying written description to refer to the same or like parts.

Figure 1A:
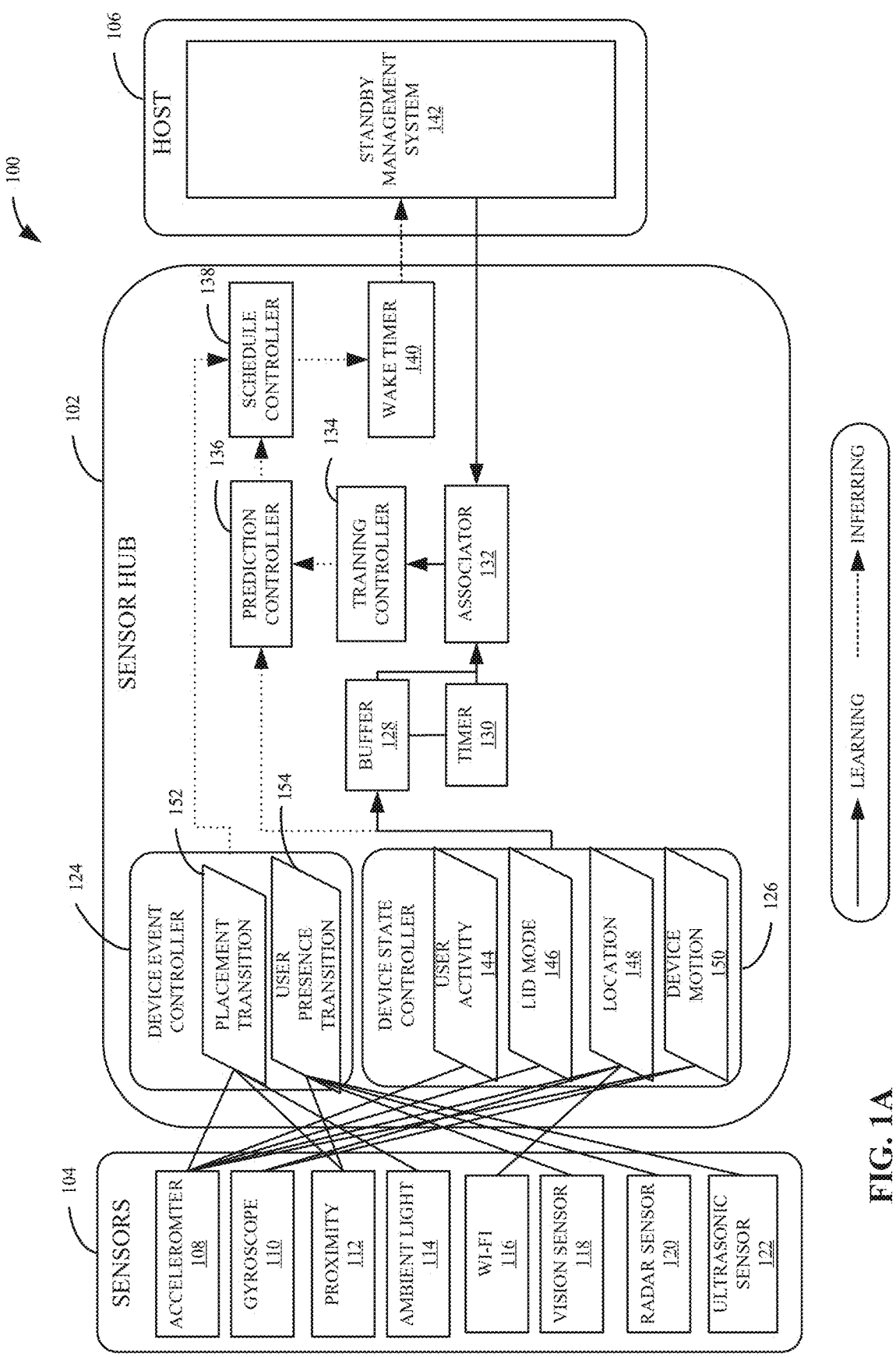
FIG. 1A illustrates a block diagram of an example device to generate a dynamic wake period schedule.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Today's personal computing devices are expected to deliver real-world user experience of all day battery life, near zero-wait responsiveness, and superb performance. Computing systems (e.g., systems of personal computing devices) have been designed based on satisfying the needs of users of different classes (e.g., gamers, home users, students, etc.). Such systems deliver hardware (HW) and/or software (SW) tradeoffs to achieve different performance goals. For example, systems may include an operating system (OS) to achieve different performance goals during active and inactive states of the computing device on which the OS executes. Such performance goals may be to achieve low power consumption of systems when the systems are in an inactive state (e.g., standby mode).

In some examples, the OS implements features that schedule wake periods of the system when the OS is in the standby mode. As used herein, a "wake" period is a time when the OS provides power (e.g., activates) to hardware and software components of the system. Such a wake period may be implemented by a standby feature that periodically "wakes up" (e.g., activates) the OS from a sleep mode (e.g., standby mode, inactive mode, etc.) to maintain connectivity to a network, sync emails (e.g., recently received emails), update calendar, etc., so that the system (e.g., the personal computing device) is ready and up-to-date when a user activates (e.g., turns on) the system.

The standby feature is initiated when a user causes the system to enter sleep (e.g., user pressing the power button, closing the lid, idling out, or selecting "Sleep" from the power button in a Start menu). When the standby feature is initiated, applications and system software transition to low-power operation. The performance goal of the standby feature is to enable the readiness of the system for activation while maintaining low power consumption to optimize battery life.

However, the standby feature, referred to herein out as standby mode, does not have a wake period schedule that is a balance between battery life and responsiveness (e.g., system readiness). For example, the standby mode may implement a pre-determined (e.g., 20 minute, 30 minute, etc.) wake period schedule, wherein every pre-determined amount of time (e.g., 30 minutes) that the OS is in standby, the OS triggers a wake notification to wake the system. In such an example, the pre-determined amount of time between triggering wake notifications may be relatively long to help save battery life at the cost of reducing the responsiveness of the system. Alternatively, the pre-determined amount of time between triggering wake notifications may be relatively short to increase responsiveness at the cost of battery life.

Therefore, such a fixed wake period schedule is inefficient. For example, the wake notification is not always needed at each pre-determined time. The user might be not using the system for a long period of time (e.g., days, weeks, hours, when driving to office and/or home, during lunch or dinner time, etc.). The unnecessary wake notifications in such situations waste battery power and can cause system hardware overheating in some environments (e.g., when the device is inside a bag, a car, etc.). In a different example, the responsiveness performance of a system in a fixed wake period schedule is undesirable. For example, the user of the system may turn on the system (e.g., activate the system) just before the next wake notification, which in turn, fails to offer the user the desired readiness and/or instant-on experience provided by the standby feature of the OS.

Examples disclosed herein enable the determination and generation of a dynamic wake period schedule that balances the battery life and responsiveness of the system when the system is in standby mode. Examples disclosed herein generate the dynamic wake period schedule by analyzing the day-to-day routines of the user through sensor measurements and correlate the routines with OS states (e.g., active or inactive). Examples disclosed herein include an Integrated Sensor Hub (ISH) that obtains sensor measurements from different sensors having any number of sensor types, determines contexts and/or conditions of the system based on the sensor measurements, and further associates those conditions with an OS state (e.g., active or inactive).

Such contexts and/or conditions are sometimes referred to as state contexts and event contexts. As used herein, state contexts are conditions corresponding to user behavior and device conditions. For example, a state context may be user activity (e.g., is the user walking, running, biking, in a vehicle, fidgeting, unknown, etc.), device motion, device and user location, etc. As used herein, event contexts are conditions corresponding to an instant transition of the state of the device. For example, an event context may be placement transition (e.g., device is being removed from a bag, device is being placed into a bag, etc.). In examples disclosed herein, the correlation between the contexts and the OS state of the device enables examples disclosed herein to learn what routine (e.g., context, condition, etc.) corresponds to what OS state and additionally what routine is performed at what time and day in a week.

Examples disclosed herein implement artificial intelligence to generate a dynamic wake period schedule. Artificial intelligence (AI), including machine learning (ML), deep learning (DL), and/or other artificial machine-driven logic, enables machines (e.g., systems, computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model is used. Using a neural network model enables the prediction of an operating system (OS) state based on previous and future contexts and/or conditions of the device. In general, machine learning models/architectures that are suitable to use in the example approaches disclosed herein will be Naïve Bayes Classifier. However, other types of machine learning models could additionally or alternatively be used such as Long/Short Term Memory (LSTM) models, a Recurrent Neural Networks (RNN), etc.

In general, implementing a ML/AI system involves at least two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using Naïve Bayes. However, any other training algorithm may additionally or alternatively be used. In examples disclosed herein, training is performed until a user behavior pattern is determined. In examples disclosed herein, training is performed at the computing device (e.g., locally). Training is performed using hyperparameters that control how the learning is performed (e.g., a learning rate, a number of layers to be used in the machine learning model, etc.). In some examples re-training may be performed. Such re-training may be performed in response to sensor measurements that indicate an abnormal and/or different routine and/or behavior of the user and device than previously determined.

Training is performed using training data. In examples disclosed herein, the training data originates from locally generated data. Because supervised training is used, the training data is labeled. Labeling is applied to the training data by an associator. In some examples, the training data is pre-processed using, for example, associating historical contextual data (e.g., sensor data analyzed to determine state and event contexts of the system) with future OS states to learn what contexts of the system corresponds to which OS states of the system.

Once training is complete, the model is deployed for use as an executable construct that processes an input and provides an output based on the network of nodes and connections defined in the model. The model is stored at the ISH. The model may then be executed by the prediction controller of the ISH.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1A illustrates a block diagram of an example device 100 to generate a dynamic wake period schedule. The example device 100 includes an example sensor hub 102, example sensors 104, and an example host 106. The example sensors 104 include an example first sensor (accelerometer) 108, an example second sensor (gyroscope) 110, an example third sensor (proximity) 112, an example fourth sensor (ambient light) 114, an example fifth sensor (Wi-Fi) 116, an example sixth sensor (vision sensor) 118, an example seventh (radar sensor) 120, and an example eighth sensor (ultrasonic sensor) 122. The example sensor hub 102 includes an example device event controller 124, an example device state controller 126, an example buffer 128, an example timer 130, an example associator 132, an example training controller 134, an example prediction controller 136, an example schedule controller 138, and an example wake timer 140. The example host 106 includes an example standby management system 142.

In FIG. 1A, the example device 100 is a computing system. For example, the computing system may be a personal computing system such as a laptop, tablet, cellular phone, and/or any other type of personal computing system. Additionally and/or alternatively, the device 100 may be a workstation, a minicomputer, etc.

In FIG. 1A, the example sensor hub 102 is a control center that integrates any number of different sensor measurements to determine a dynamic wake schedule for the host 106. The example sensor hub 102 is implemented by a processor (e.g., microprocessor, microcontroller, digital signal processor (DSP), co-processor, etc.). Additionally and/or alternatively, the example sensor hub 102 may be implemented by an edge device (e.g., an external device) and/or a cloud device (e.g., a server, a virtualized device, etc.). In some examples, the sensor hub 102 off-loads processing tasks from the host 106 to provide performance improvement of the device 100 as well as optimal power distribution in the device 100.

In FIG. 1A, the example sensors 104 are sensors of the example device 100 that monitor internal and external environment of the device 100. In some examples, the sensors 104 are installed in/on the device 100. For example, the device 100 may be designed and manufactured to include any number of sensors. Although the example sensors 104 are illustrated as including eight sensors, the example device 100 can include additional and/or alternative sensors not illustrated. Additionally, the example device 100 can include multiple sensors of the same type.

The example sensors 104 include the example accelerometer 108 to measure the acceleration of the device 100. For example, the accelerometer 108 measures the motion of the device 100 when the device is portable and moved from different locations. In some examples, when the device 100 is a laptop, the accelerometer 108 can measure acceleration of the lid (e.g., the upper lid and/or lower lid of the clamshell) during an opening and/or closing of the laptop. Acceleration is measured in gravitational acceleration (g). In some examples, measurements output by the accelerator 108 is used in conjunction with additional sensor measurements to determine event and state contexts.

The example sensors 104 include the example gyroscope 110 to measure the rotational and angular movement of the device 100. For example, the gyroscope 110 measures the tilt of a cell phone or laptop. Rotational and angular movement is measured in degrees per second (°/s) or radians per second (RPS). In some examples, measurements output by the gyroscope 110 are used in conjunction with additional sensor measurements to determine state contexts.

The example sensors 104 include the example proximity sensor 112 to detect the presence of objects near the device 100. For example, the proximity sensor 112 can detect when a user is present (e.g., using the device 100), when the device 100 is positioned in a bag, etc. Proximity is measured in volts (v), which correspond to distance in millimeters (mm). In some examples, measurements output by the proximity sensor 112 are used in conjunction with additional sensor measurements to determine state and event contexts.

The example sensors 104 include the example ambient light sensor 114 to detect light quality and intensity of the external environment of the device 100. For example, the ambient light sensor 114 is used to determine the brightness or dimness of the location in which the device 100 is placed. Ambient light is measured in volts (v) which is proportional to ambient light. In some examples, the measurements output by the ambient light sensor 114 are used in conjunction with additional sensor measurements to determine event contexts.

The example sensors 104 include the Wi-Fi sensor 116 to provide information corresponding to a presence of Wi-Fi and/or Wi-Fi signal strength. For example, the Wi-Fi sensor 116 can output binary measurements (e.g., such as 1s and 0s) indicating whether Wi-Fi is present at the device 100. In some examples, the Wi-Fi data might contribute to a probability of future use of the device 100. For example, consider the device 100 initially is not connected to Wi-Fi, but then transitions to a particular Wi-Fi signal that is, initially, weak (e.g., the connectivity is weak). In such an example, the Wi-Fi signal may increase in strength over time. Historical observation may support identification of a user routine, where the user is on a train, bus, car, in a commute to work. The weak Wi-Fi signal may indicate the user has almost arrived to their desk. The example Wi-Fi sensor 116 may be used in conjunction with additional sensor measurements to determine state contexts.

The example sensors 104 include the example vision sensor 118 to capture external images of the environment of the device 100. For example, a vision sensor 118 may be a camera. In some examples, the vision sensor 118 can identify objects near the device 100. In some examples, the measurements output by the vision sensor 118 are used in conjunction with additional sensor measurements to determine event and state contexts.

The example sensors 104 includes the example radar sensor 120 to detect objects and motion around the device 100. For example, the radar sensor 120 uses radio waves to determine the size, location, and proximity of objects to the device 100. Object detection is measured meters (m). In some examples, measurements output by the radar sensor 120 are used in conjunction with additional sensor measurements to determine event contexts.

The example sensors 104 include the example ultrasonic sensor 122 uses sonar to determine distance to an object. For example, the ultrasonic sensor 122 can determine the distance of a user from the device 100. Distance is measured in meters (m). In some examples, measurements output by the ultrasonic sensor 122 are used in conjunction with additional sensor measurements to determine event contexts.

In FIG. 1A, the example sensors 104 are connected to the example sensor hub 102. In some examples, the connection between the sensors 104 and the sensor hub 102 is hardwired. Additionally and/or alternatively, the connection between the sensors 104 and the sensor hub 102 is wireless. For example, the sensors 104 may be located in various locations on the device 100 different than the location of the sensor hub 102 and therefore may wirelessly output measurements to the sensor hub 102 via any type of wireless communication.

In FIG. 1A, the example sensor hub 102 includes the example device event controller 124 and the example device state controller 126 to obtain the measurements from the sensors 104 (e.g., wirelessly or hard-wired) and perform event and state context determination.

The example device state controller 126 determines state contexts of the device 100 based on the measurements of the sensors 104. For example, the device state controller 126 determines user activity data 144, lid mode data 146, location data 148, and device motion data 150 based on measurements from the multiple sensor types in the sensors 104. The user activity data 144, lid mode data 146, location data 148, and device motion data 150 are determined to enable the sensor hub 102 to infer the user intention to activate the device 100.

For example, the device state controller 126 determines user activity data 144 by collecting and analyzing measurements from the accelerometer 108. The user activity data 144 corresponds to what the user is doing (e.g., with the device 100 nearby). For example, the device state controller 126 determines whether the user is walking, running, in a vehicle, on a bike, etc.

The example device state controller 126 determines lid mode data 146 by collecting and analyzing measurements from the accelerometer 108. The lid mode data 146 corresponds to how the device 100 is postured. For example, if the device 100 is a clamshell (e.g., laptop), the accelerometer 108 can be used to determine that the lid is fully open, fully closed, or partially open/partially closed. If the device 100 is a tablet, the device state controller 126 may determine additional lid modes 146 such as tablet mode, wherein the upper lid of the table faces up.

The example device state controller 126 determines the location data 148 of the device 100 by collecting and analyzing measurements from the Wi-Fi 116, the gyroscope 110, and the accelerometer 108. The location data 148 corresponds to the location of the device 100 and user of the device 100. For example, the device state controller 126 determines whether the device 100 is at home, walking to work, in an office, etc.

The example device state controller 126 determines the device motion data 150 of the device 100 by collecting and analyzing measurements from the accelerometer 108 and gyroscope 110. The device motion data 150 corresponds to the motion status of the device 100. For example, the device state controller 126 determines if the device is still or moving.

The example device state controller 126 is not limited to determine the four above mentioned state contexts. For example, the device state controller 126 can manipulate any one of the sensors 104 to determine additional state contexts that would enable and/or assist the sensor hub 102 to infer user intention of the device 100. For example, the device state controller 126 can determine times (e.g., dates, hours, minutes, seconds, etc.) when the device 100 is typically used and not used by the user. The example device state controller 126 of FIG. 1A may implement means for determining. The determining means is hardware including at least one processor.

In FIG. 1A, the example device event controller 124 determines event contexts of the device 100 based on the measurements of the sensors 104. For example, the device event controller 124 determines placement transition 152 and user presence transition 154 based on measurements from the multiple sensor types of the sensors 104. The placement transition 152 and user presence transition 154 are determined to enable the sensor hub 102 to access any immediate actions taken by the user for possible override of a wake trigger.

The example device event controller 124 determines the placement transition 152 of the device 100 based on collecting and analyzing sensor measurements from the accelerometer 108, the proximity sensor 112, and the ambient light sensor 114. The placement transition 152 corresponds to the transition between locations of the device 100. For example, the device event controller 124 may initiate, update, etc., the placement transition 152 when the device 100 is moved from an enclosed area (e.g., a bag) to an open area (e.g., on a desk). In some examples, the placement transition 152 is data that informs the schedule controller 138 when the bag transitions between locations and what type of transition took place. In some examples, the device event controller 152 controls when the placement transition 152 is to be provided to the schedule controller 138. For example, the device event controller 152 may set flags, indicators, etc., corresponding to placement transition, that are to update when the sensor measurements indicate a placement transition.

The example device event controller 124 determines the user presence transition 154 based on collecting and analyzing sensor measurements from the proximity sensor 112, the ambient light sensor 114, the vision sensor 118, the radar sensor 120, and/or the ultrasonic sensor 122. The user presence transition 154 corresponds to whether the user has transitioned between a location near the device 100 and a location distant from the device 100. For example, a threshold distance between the device 100 and user may define whether the user is near the device 100. The threshold distance may correspond to an arm's length, a range in which the sensors 104 (e.g., the proximity 112, the radar sensor 120, and/or the ultrasonic sensor 122) are capable of detecting the user, etc. In some examples, the device event controller 124 includes flags, indicators, etc., corresponding to the user presence transition 154, that update when sensor measurements indicate a user is currently present, has recently moved away from the device 100, etc. The example device event controller 124 of FIG. 1A may implement means for determining. The determining means is hardware including at least one processor.

In FIG. 1A, the example sensor hub 102 illustrates flow lines between the device event controller 124, the device state controller 126, the buffer 128, the timer 130, the associator 132, the training controller 134, the prediction controller 136, the schedule controller 138, the wake timer 140, and the standby management system 142. The solid flow lines represent a learning phase occurring at the sensor hub 102. For example, the operations performed by the buffer 128, the timer 130, the associator 132, and the training controller 134 occur in a learning and/or training phase to train a prediction model. The dotted flow lines represent an inference phase occurring at the sensor hub 102. For example, the operation performed by the prediction controller 136, the schedule controller 138, and the wake timer 140 occur in an inferring and/or predicting phase.

In FIG. 1A, the example sensor hub 102 includes the example buffer 128 to store state contexts generated by the device state controller 126. For example, the buffer 128 stores user activity data 144, lid mode data 146, location data 148, device motion data 150, etc. In some examples, the buffer 128 obtains updated state contexts when the device state controller 126 determines updated contexts. In some examples, the buffer 128 is implemented by a plurality of latches, a cache, and/or any other type of temporary storage device. In some examples, the buffer 128 stores historical state contexts. For example, state contexts are considered historical when they correspond to previous/past states of the device 100. The example buffer 128 of FIG. 1A may implement means for storing. The storing means is hardware including at least one processor.

In FIG. 1A, the example sensor hub 102 includes the example timer 130 to inform the example buffer 128 to release and/or provide state contexts to the example associator 132. For example, the timer 130 delays the period between the buffer 128 obtaining the state contexts and the associator 132 obtaining the state contexts. In such an example, the state contexts can be considered historical when retrieved at a later time that the time they are associated with. For example, the state contexts are associated with a time and day for which they occurred (e.g., the user activity data 144 is indicative that the user of the device 100 was biking at 6:00 am on Monday morning). The example timer 130 informs the example buffer 128 to send the state contexts and their associated times to the associator 132 when the delay (e.g., a pre-determined time) threshold is met.

In FIG. 1A, the example sensor hub 102 includes the example associator 132 to associate and/or correlate the state contexts with an OS state. The example associator 132 may be provided with and/or obtain the state contexts from the example buffer 128 and obtain the OS state from the example standby management system 142. The example associator 132 correlates the state contexts and the OS state by generating histograms over a time frame. For example, the associator 132 collects and associates state contexts and OS states of the device 100 over a period of 24 hours, a week, etc. An example of one or more histograms is illustrated in FIG. 1B.

Figure 1B:
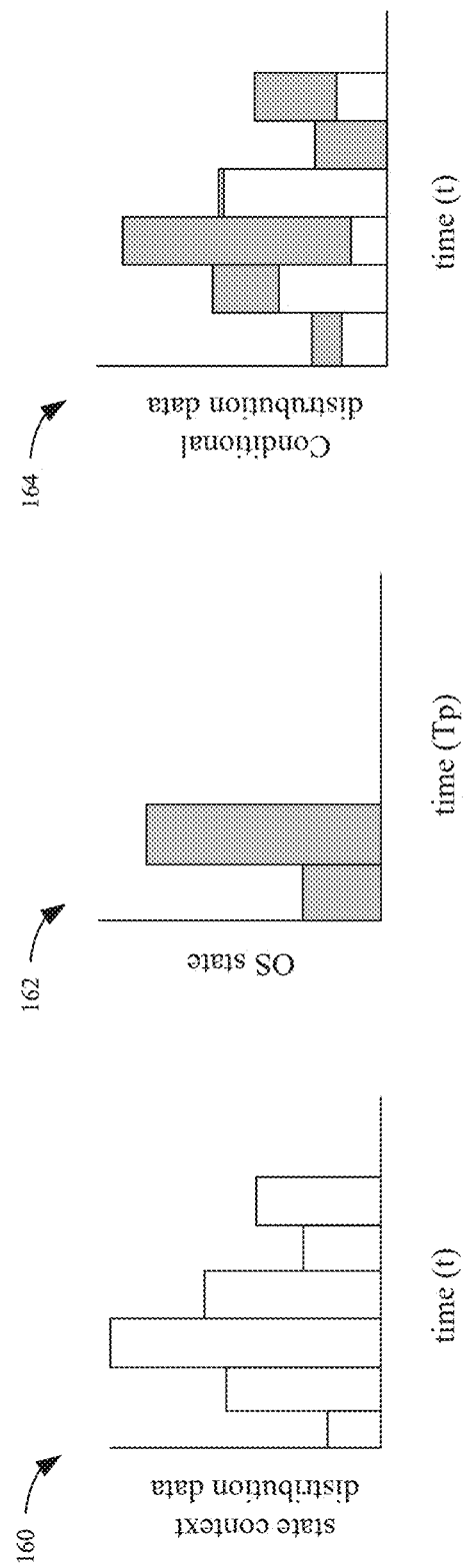
FIG. 1B illustrates example histograms generated by an example associator of FIG. 1A to represent an association between context data and future OS states.

Turning to FIG. 1B, example histograms generated by the example associator 132 are shown. Histograms may be generated to reflect the distribution of conditional contexts (e.g., state contexts) OS states, and an association between the two (e.g., conditioned OS states) over the time frame (e.g., 24 hours, a week, etc.). The example of FIG. 1B includes an example state context histogram 160, an example OS state histogram 162, and an example association histogram 164.

The example associator 132 generates the example state context histogram 160 to represent any number of state contexts gathered over a period of time (e.g., 24 hours). For example, the x-axis illustrates the time intervals (e.g., minutes, hours, etc.) at which the state contexts are collected. In some examples, the x-axis illustrates iterations of the time t at which the state contexts are collected by the device state controller 126. For example, illustrated by the x-axis of state context histogram 160, the device state controller 126 collects state context data at time t, t+1, t+2, t+3, t+4, and t+n, where n represents a future time bin. In the example state context histogram 160, the y-axis represents the frequency of state context distribution data. For example, each frequency level may correspond to a number of occurrences of a status of a type of state context data (e.g., type of state context data is user activity data 144, the status is walking, and the number of occurrences the user was walking is 10 times over a particular time bin). In some examples, the associator 132 generates a number of state context histograms 160 to represent each type of state context data (e.g., user activity data 144, lid mode data 146, location data 148, device motion data 150, and/or any other type of state data determined by the device state controller 126). In some examples, the associator 132 updates (e.g., adjusts) the state context histogram 160 every time period (e.g., 24 hours) and/or generates a new state context histogram 160 every time period (e.g., 24 hours).

The example associator 132 generates the example OS state histogram ($hist_{osstate}$) 162 to represent the state of the operating system collected over the period of time (e.g., 24 hours). The example OS state histogram represents an OS state distribution, where the y-axis illustrates the frequency of each OS state (e.g., the number of occurrences that the OS state is in an active and/or inactive state) collected and the x-axis illustrates the time intervals (e.g., in minutes, hours, etc.) at which the OS states are collected. For example, the y-axis of the OS state histogram 162 illustrates the frequency level of OS states, where the frequency level may correspond to a number of occurrences of a status of operating system (e.g., the status is active and the number of occurrences the OS is active is 15 times over a particular time bin). In some examples, the x-axis illustrates iterations of the time t+Tp at which the OS states are collected by the associator 132. For example, illustrated by the x-axis of OS state histogram 162, the device state controller 126 collects state context data at time t+Tp, (t+1)+Tp, (t+2)+Tp, (t+3)+Tp, (t+4)+Tp, and (t+n)+Tp, where n represents a future time bin. The time bin width determines the time granularity of predictions, which is mainly a balance between responsiveness and memory resource. In some examples, the associator 132 updates (e.g., adjusts) the OS state histogram 162 every time period (e.g., 24 hours) and/or generates a new OS state histogram 162 every time period (e.g., 24 hours).

The example associator 132 generates the example association histogram 164 to represent an association between the state context data and the OS states over the time period. For example, the associator 132 combines the state context histogram 160 and the OS state histogram 162 to generate the association histogram 164. The example association histogram 164 represents a conditional distribution of state context data (e.g., user activity data 144) versus OS states (e.g., active and inactive), where the y-axis illustrates the frequency of occurrences of each status of user activity data 144 that falls into each time interval (e.g., minutes, hours, etc.) under each OS state and the x-axis illustrates the time intervals (e.g., in minutes, hours, etc.) at which the state contexts and OS states are collected and associated (e.g., correlated, related, linked, connected, etc.). For example, the y-axis may include a number of frequency points representing the user activity data 144 and OS state (e.g., walking at time t and inactive at time t+Tp, sitting at time t+2 and active at time (t+2)+Tp, riding in vehicle at time t+4 and inactive at time (t+4)+Tp, biking at time t+n and inactive at time (t+n)+Tp, etc.). The example associator 132 may generate association histograms 164 for each state context type (e.g., lid mode data 146 versus OS state, location data 148 versus OS state, device motion data 150 versus OS state, etc.). For example, $hist_{activity\text{-}vs\text{-}osstate}$ is an association histogram 164 that represents the conditional distribution of user activity data 144 at time t conditioned by an OS state at time t+Tp. In yet another example, $hist_{lidmode-vs-osstate}$ is an association histogram 164 that represents the conditional distribution of lid mode data 146 states at time t conditioned by OS states at time t+Tp. Additionally and/or alternatively, the associator 132 may generate a single association histogram 164 to represent a combination of the state contexts and the corresponding OS states over a time frame (e.g., one day, a week, month, year, etc.). In some examples, the associator 132 may generate association histograms 164 corresponding to weekdays (e.g., Monday-Friday) and association histograms 164 corresponding to weekends (e.g., Saturday-Sunday). For example, user behavior may be different between the weekdays and the weekends due to work schedule, free-time, hobbies, etc.

The example associator 132 of FIG. 1A may implement means for associating. The association means is hardware including at least one processor.

Turning to the example of FIG. 1A, the example sensor hub 102 includes the example training controller 134 to incrementally learn and build a prediction model personalized for the user of the example device 100. The example training controller 134 obtains information from the example associator 132 and identifies daily, weekly, monthly, and/or yearly user behavior patterns. For example, the training controller 134 identifies the future status of the OS state based on user behavior, such as previously associated state contexts and OS states. The example training controller 134 generates the prediction model based on the determined and/or identified user behavior patterns. Once generated, the example training controller 134 publishes the prediction model. In this manner, the example prediction controller 136 of the inference phase can access and utilize the prediction model for future, real-time predictions. The example training controller 134 is described in further detail below in connection with FIG. 2. The example training controller 134 of FIG. 1A may implement means for generating. The generating means is hardware including at least one processor.

In FIG. 1A, the example sensor hub 102 includes the example prediction controller 136 to predict (e.g., estimate) the probability that a user will use the device 100 at a future time. For example, the prediction controller 136 determines when the OS state will be active based on information from the device state controller 126 and the published prediction model. The example prediction controller 136 operates in real-time, meaning that the prediction controller 136 obtains current (e.g., up-to-date) state contexts from the device state controller 126 and predicts an OS state based on the contexts. In some examples, the output of the prediction controller 136 is an indication and/or notification that a user is going to activate the OS at time t, not activate the OS state for a period of time, etc. The output of the example prediction controller 136 is provided to the example schedule controller 138. The example prediction controller 136 is described in further detail below in connection with FIG. 3. The example prediction controller 136 of FIG. 1A may implement means for generating. The generating means is hardware including at least one processor.

In FIG. 1A, the example sensor hub 102 includes the example schedule controller 138 to determine the dynamic wake period (e.g., the time when the standby management system 142 provides power (e.g., activates) to hardware and software components of the host 106) based on the output of the prediction controller 136 and event contexts from the example device event controller 124. In some examples, the schedule controller 138 reduces power consumption of the device 100 by initiating a wake event before the device 100 becomes active to prepare the device for exiting an inactive state. For example, the wake event causes the standby management system 142 to update the device while consuming as little power as possible, thereby facilitating minimum power required to fully boot (e.g., activate) the host 106 from a sleep state (e.g., an inactive state). The dynamic wake period (Tw) is determined based on a combination of the likelihood a user will use the device 100 and the event contexts. The wake period Tw is dynamic because it can change based on the external environment of the device 100. The example schedule controller 138 considers the event contexts to determine any immediate transitions of the device 100 that may correlate to an OS state. For example, placement transition 152 indicative that the device 100 is removed from a bag informs the schedule controller 138 that the OS state is likely to be activated. In some examples, the schedule controller 138 overrides the output of the prediction controller 136 based on event contexts. For example, the prediction controller 136 outputs an indication that the device 100 will not be activated for the next 10 minutes but the device event controller 124 determines that a user has just approached the device 100. In such an example, the schedule controller 138 schedules a wake period to occur promptly, rather than waiting 10 minutes, due to the event context.

In FIG. 1A, the example sensor hub 102 includes the example wake timer 140 to trigger a wake event based on the wake period Tw. As used herein, a wake event is an event that causes the standby management system 142 to transition the sleep state (e.g., inactive, idle, etc.) of the host 106 to a working state. The example wake timer 140 may be a waitable timer object that specifies the time at which the host 106 is to wake. A waitable timer object is a synchronization object whose state is set to "signaled" when the specified time (e.g., wake period Tw) arrives. For example, the wake timer 140 is a manual-reset, synchronization, or periodic timer that is provided a "due time" (e.g., the wake period Tw) from the schedule controller 138. The wake timer 140 completes a wait operation (e.g., sends a trigger once the wait condition is met) when the wake period Tw expires. When a timer is signaled, the host 106 (e.g., processor) must run to process the associated instructions.

In FIG. 1A, the example sensor hub 102 includes the example standby management system 142 to transition the OS, and/or more generally the example host 106, from an inactive state to an active state when the example wake timer 140 triggers a wake event. The example standby management system 142 is initiated by the example wake timer 140. The example standby management system 142 includes operations that "wake up" specific applications of the host 106, such as email applications (to sync received emails), calendar applications (to update events), scanners (to sync updates to the OS), etc. In this manner, the user is provided with a prepared device 100 for immediate use. The example standby management system 142 is communicatively coupled to the sensor hub 102 and the example host 106.

An example training operation of the example sensor hub 102 is described below. The example sensors 104 monitor the external environment of the example device 100. The example sensors 104 collect and determine measurements based on the results of monitoring the external environment of the device 100. The example sensors 104 provide sensor measurements to the example device event controller 124 and the example device state controller 126. The example device state controller 126 determines a status of the user activity data 144, the lid mode data 146, the location data 148, and the device motion data 150.

For example, the device state controller 126 determines whether a user is walking, running, moving by means of a vehicle, biking, etc., (e.g., user activity data 144) based on measurements from the example accelerometer 108. For example, the device state controller 126 can utilize activity recognition to determine user activity data 144 based on solving a classification problem using time and frequency domain features extracted from accelerometer data (e.g., data extracted from the example accelerometer 108 and stored in a memory of the sensor hub 102). The example device state controller 126 determines whether the lid of the device 100 is open, closed, clamshell, etc., (e.g., lid mode data 146) based on measurements from the example accelerometer 108. For example, the device state controller 126 can detect the lid mode data 146 based on determining the hinge angle, if the device 100 is a laptop or tablet. For example, the device state controller 126 can extract accelerometer data from two accelerometers placed on each panel of the lid to determine the hinge angle.

The example device state controller 126 determines whether the device 100 is at home, in the office, on the road, etc. (e.g., the location data 148) based on measurements from the example Wi-Fi 116, the example gyroscope 110, and/or a global positioning system (GPS) (not illustrated). For example, the device state controller 126 can implement Pedestrian Dead Reckoning (PDR) when the GPS is generating inaccurate measurements. For example, PDR uses estimations of speed and course over elapsed time to determine current location of the device 100. The example device state controller 126 determines whether the device 100 is still, in motion, etc., (e.g., device motion data 150) based on measurements from the accelerometer 108. For example, the device state controller 126 can detect device motion status by monitoring the motion intensity extracted from the accelerometer data.

The example device state controller 126 outputs the statuses of the state contexts to the example buffer 128. The example buffer 128 stores the state contexts with a corresponding time stamp. For example, the buffer 128 stores the state contexts with a timestamp t. The timestamp t corresponds to the time the state context occurs (e.g., the time the sensors 104 collected measurements corresponding to the state contexts). The example buffer 128 stores the state contexts for a period of time (e.g., a threshold period, a pre-determined period, etc.). The example timer 130 determines the period of time that the buffer 128 stores the state contexts of time t. For example, the timer 130 acts as a delay, delaying the buffer 128 from evicting the state contexts. The length of the delay (e.g., the period of time of that the buffer 128 stores the state contexts) is determined by the maximum predictable time (Tp) between a user action and a time the OS state activates. The maximum predictable time Tp is determined based on a balance between prediction efficiency (e.g., an efficient time to prepare and ready the device 100) and effectiveness of association. The effectiveness of association relates to the relevancy of an OS state with a state context. For example, state contexts are more relevant (e.g., correlate more with) to OS states that occur within a short term.

When the period of time after time t is met, the example buffer 128 provides the state contexts to the example associator 132. For example, the buffer 128 provides the state contexts to the associator 132 at time t+Tp. In response to obtaining the state contexts, the example associator 132 queries the example standby management system 142 for the OS state. For example, the associator 132 queries the example standby management system 142 for the OS state of the host 106 at time t+Tp. In an alternative example, the example buffer 128 evicts the state contexts and allocates them to the example associator 132 shortly after obtaining the state contexts at time t. In such an example, the timer 130 is initiated when the associator 132 obtains the state contexts and delays the associator 132 from querying the standby management system 142 for the maximum predictable time Tp. For example, the associator 132 obtains the state contexts at time t and waits the maximum predictable time period Tp to retrieve the OS state from the standby management system 142.

The example associator 132 associates the state contexts with the OS state. For example, the associator 132 correlates each and/or a combination of the state contexts with the OS state that occurred at the maximum predictable time Tp after the state contexts.

In some examples, the associator 132 stores the correlations in memory to generate one or more histograms (e.g., state context histogram(s) 160, OS state histogram(s) 162, and/or association histogram(s) 164). For example, the memory stores correlations that are determined by the associator 132 over a user behavior pattern period (e.g., one day, one week, etc.). The example associator 132 generates a state context histogram 160, an OS state histogram 162, and an association histogram 164. For example, the associator 132 generates an association histogram 164 corresponding to the frequency of OS states and user activity data 144 over the user behavior pattern period, an association histogram 164 corresponding to the frequency of OS states and lid mode data 146 over the user behavior pattern period, an association histogram 164 corresponding to the frequency of OS states and location data 148 over the user behavior pattern period, an association histogram 164 corresponding to the frequency of OS states and device motion data 150 over the user behavior pattern period, and/or an association histogram 164 corresponding to the OS states and a combination of the state contexts over the user behavior pattern period.

In some examples, the associator 132 builds and/or generates histograms corresponding to multiple user behavior pattern periods. For example, a first user behavior pattern period may correspond to Monday-Friday, a work week, while a second user behavior pattern period may correspond to Saturday-Sunday, a weekend. The first and second user behavior pattern periods may be different because the user may have different routines in one week. Therefore, the example training controller 134 is provided with accurate representations of the user's behavior it is beneficial to generate different histograms for different time periods include accurate representations of a user's behavior.

The example training controller 134 obtains the associations and/or histograms from the example associator 132 and trains a prediction model to predict probabilities. For example, the training controller 134 trains the prediction model to predict whether a user will use the device 100 at time t+Tp and/or whether the user will use the device 100 at time t+Tp given the current state contexts. In some examples, the training controller 134 is to train the prediction model to output likelihoods of probabilities. For example, the training controller 134 outputs likelihoods of observing a state context at time t given an OS state at time t+Tp. For example, the prediction model determines a likelihood that user activity data 144 will be equal to "biking" when the OS state is equal to inactive at time t+Tp.

The operation of the example training controller 134 is described in further detail below in connection with FIG. 2.

When the example training controller 134 has determined that an acceptable amount of error generated by the prediction model is met, the example training controller 134 publishes the prediction model. In some examples, the training controller 134 periodically updates and re-publishes the model when new information (e.g., state contexts, updated histograms, etc.) about the user's behavior is received. In some examples, the training operation ends when the acceptable amount of error is met.

Figure 2:
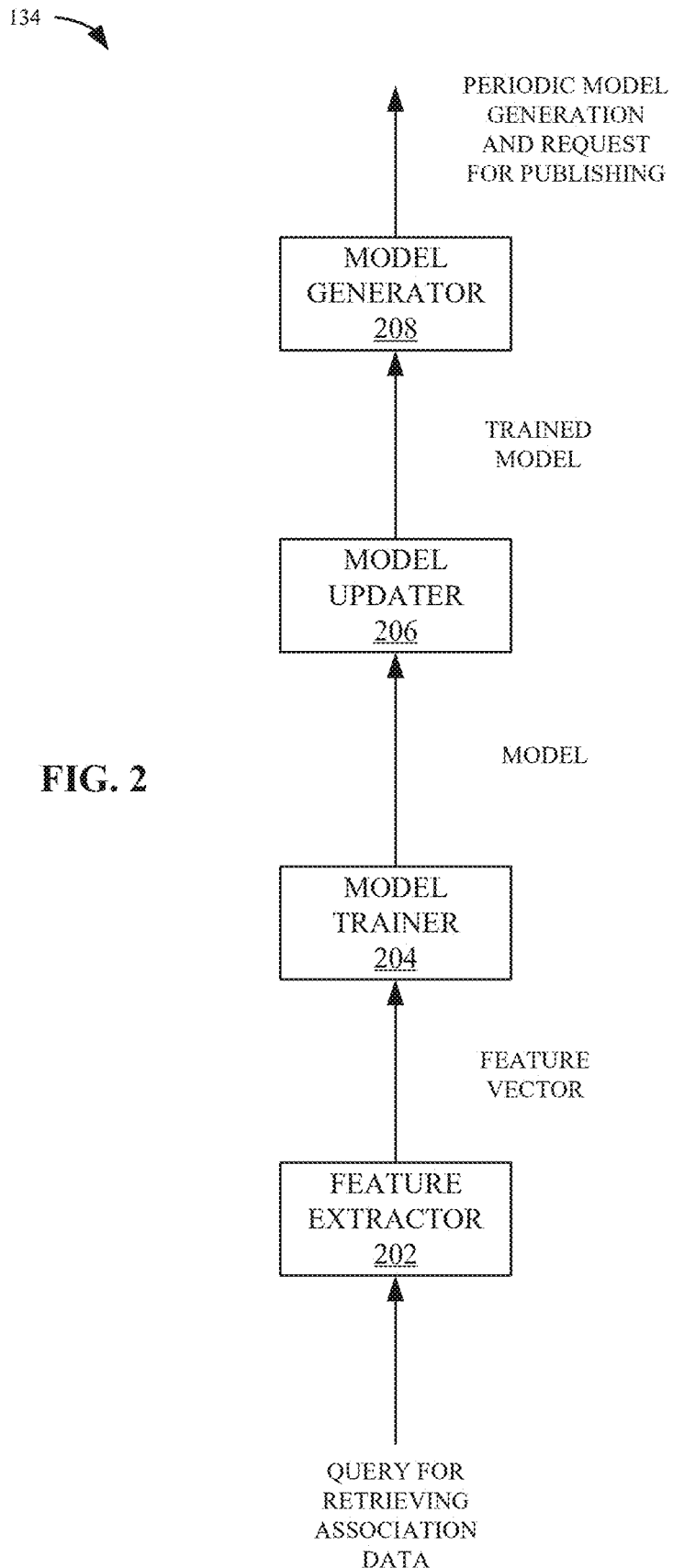
FIG. 2 is a block diagram of an example training controller of FIG. 1 to generate a prediction model.

Turning to FIG. 2, a block diagram of the example training controller 134 of FIG. 1A is illustrated to generate a prediction model. The example training controller 134 includes an example feature extractor 202, an example model trainer 204, an example model updater 206, and an example model generator 208.

In FIG. 2, the example training controller 134 includes the feature extractor 202 to generate a feature vector based on a query for retrieving association data from the example associator 132. The example feature extractor 202 generates or otherwise builds derived values of feature vectors (e.g., representative of features in the histograms 160, 162, 164) that are to be informative and non-redundant to facilitate the training phase of the training controller 134. As used herein, a feature vector is an n-dimensional array (e.g., a vector) of features that represent some state context, device state, measurement parameter, time, etc. For example, a feature could be a state context of the device 100 such as user activity data 144, lid mode data 146, location data 148, device motion data 150, etc. The example feature extractor 202 reduces input data (e.g., the histograms 160, 162, 164 from the associator 132) into more manageable groups (e.g., features) for processing, while describing the original input data with sufficient completeness and accuracy. In the illustrated example of FIG. 2, the feature extractor 202 identifies features in histogram data that correspond to a user behavior pattern. The feature data provided by the feature extractor 202 facilitates the model trainer 204 in training a model to detect a future OS state of the device 100 based on previous user behavior. For example, the associator 132 of FIG. 1A detects user behavior patterns based on the state contexts and OS states of the device 100 throughout a 24 hour time period. The example feature extractor 202 extracts condition vectors of the user behavior patterns and provides the condition vectors to the model trainer 404. A condition vector may represent specific conditions that cause an OS state to transition between inactive and active at a future time. For example, a condition vector can indicate when the user is sitting and the lid of the device 100 is open, then the OS state is active. In other examples, a condition vector can indicate when the user is located in the office and the time is 12:00 μm, the OS state will be active in 30 minutes. The condition vector is not an immediate indication of a device transition, like an event context. For example, the condition vector is an association between a state context occurring at time t and an OS state occurring at time t+Tp (e.g., a period of time after the state context) but the event context is an immediate transition of the device 100 that could cause an immediate activation of the OS or deactivation of the OS. After the example feature extractor 202 extracts features of the association data (e.g., association histogram(s) 164), it outputs a feature vector.

In FIG. 2, the example training controller 134 includes the example model trainer 204 to train a prediction model based on the output feature vector of the example feature extractor 202. The example model trainer 204 operates in a training mode where it receives a plurality of association data, generates a prediction, and outputs a model based on that prediction. For the example model trainer 204 to generate a model, it receives feature vectors corresponding to predetermine conditions of OS states. For example, during a training mode, OS states are already determined and conditions are already defined by the patterns of the histograms (e.g., the state context histogram(s) 160, the OS state histogram(s) 162, and/or the association histogram(s) 164) so that the data provided to the training controller 134 is suitable for learning. For example, the model trainer 204 receives a feature vector indicative of the features of state contexts and OS states and identifies a pattern in the state contexts and resulting OS states that map the state contexts to the future OS state and outputs a model that captures these patterns.

In some examples, the model trainer 204 implements a Naïve Bayes function to generate output probabilities and predictions about the future OS states. For sake of simplicity and explanation, only two types of state contexts, user activity data 144 and lid mode data 146, will be described below in connection with the Naïve Bayes function. However, the example model trainer 204 may utilize each state context type for training. In a Naïve Bayes function, different types of probabilities are inferred. For example, the model trainer 204 may determine a prior probability, a posterior probability, and a likelihood probability. A prior probability corresponds to parameters θ, such as a random event or an uncertain proposition, wherein the prior probability is the unconditional probability that is determined about the parameters before any relevant evidence is considered $p(\theta)$. For example, the model trainer 204 determines a prior probability (P(O=active)) that a user will use the device 100 at time t+Tp (e.g., OS is in active state), wherein the OS state is the parameter and the probability is the time at which the OS state is active. This prior probability (P(O=active)) can be directly estimated from the OS state histogram 162 ($hist_{osstate}$).

A posterior probability is the probability of parameters θ given evidence X: $(p(\theta|X))$. For example, the model trainer 204 determines a posterior probability P(O=active|A, L) that user will use the device 100 at time t+Tp given the current context states (A: activity data 144 and L: lid mode data 146) at time t. The posterior probability is the target probability that the example model trainer 204 learns to predict.

A likelihood probability is the probability of the evidence X given the parameters $\theta$:$(p(\theta|X))$. For example, the model trainer 204 determines the likelihood probability of the state of user activity data 144 (P(A|O=active), P(A|O=inactive)) at time t given the OS state at time t+Tp. The example model trainer 204 can directly estimate the likelihood probability of the state of the user activity data 144 (P(A|0=active), P(A|O=inactive)) from one of the example association histograms 164 (e.g, $hist_{activity\text{-}vs\text{-}osstate}$). In a different example, the model trainer 204 determines the likelihood probability of the state of the lid mode data 146 (P(L|O=active), P(L|O=inactive)) at time t given the OS state at time t+Tp. The example model trainer 204 can directly estimate the likelihood probability of the state of the lid mode data 146 (P(L|O=active), P(L|O=inactive)) from one of the example association histograms 164 (e.g., $hist_{lidmode\text{-}vs\text{-}osstate}$).

The example model trainer 204 learns and/or otherwise determines the posterior probability P(O=active|A, L) utilizing example Equation 1 below. In Equation 1, P(A, L) corresponds to a predicted prior probability of the state of user activity data 144 (A) and the state of lid mode data 146 (L) at time t and P(A, L|O=active) corresponds to the likelihood probability of the state of user activity data 144 (A) and the state of lid mode data 146 (L) at time t give the OS state is active at time t+Tp.

$$P(O = \text{active}|A, L) = P(O = \text{active}) \times \frac{P(A, L|O = \text{active})}{P(A, L)} \quad \text{Equation 1}$$

In some examples, the model trainer 204 determines the likelihood probability of the state of user activity data 144 (A) and the state of lid mode data 146 (L) at time t give the OS state is active at time t+Tp utilizing example Equation 2 below.

$$P(A,L|O=\text{active})=P(A|O=\text{active}) \cdot P(L|O=\text{active}) \quad \text{Equation 2}$$

In some examples, the model trainer 204 determines the predicted prior probability of the state of user activity data 144 (A) and the state of lid mode data 146 (L) at time t utilizing example Equation 3 below.

$$P(A,L)=(P(A|O=\text{active}) \times P(L|O=\text{active}))+(P(A|O=\text{inactive}) \times P(L|O=\text{inactive})) \quad \text{Equation 3}$$

The example model trainer 204 trains the model to determine the posterior probability given the association data. The example model trainer 204 provides the output model to the example prediction controller 136 to assist in generating predictions on new state contexts in which the intended OS state is unknown.

In FIG. 2, the example training controller 134 includes the example model updater 206 to flag a model received from the model trainer 204 as new and/or updated. For example, the model updater 206 can receive a model from the model trainer 204 that provides a prediction algorithm to detect an OS state corresponding to state contexts of the weekday. The example model updater 406 determines that a model of this type is new and, therefore, tags it as new. Alternatively, the example model updater 206 determines that a model of this type has been generated previously and, therefore, will flag the model most recently generated as updated. The example model updater 206 provides the new and/or updated model to the example model generator 208.

In FIG. 2, the example training controller 134 includes the example model generator 208 to generate a model for publishing. For example, the model generator 208 may receive a notification from the model updater 206 that a new and/or updated model has been trained and the model generator 208 may create a file in which the model is published so that the model can be saved and/or stored as the file. In some examples, the model generator 208 provides a notification to the prediction controller 136 that a model is ready to be transformed and published.

Figure 3:
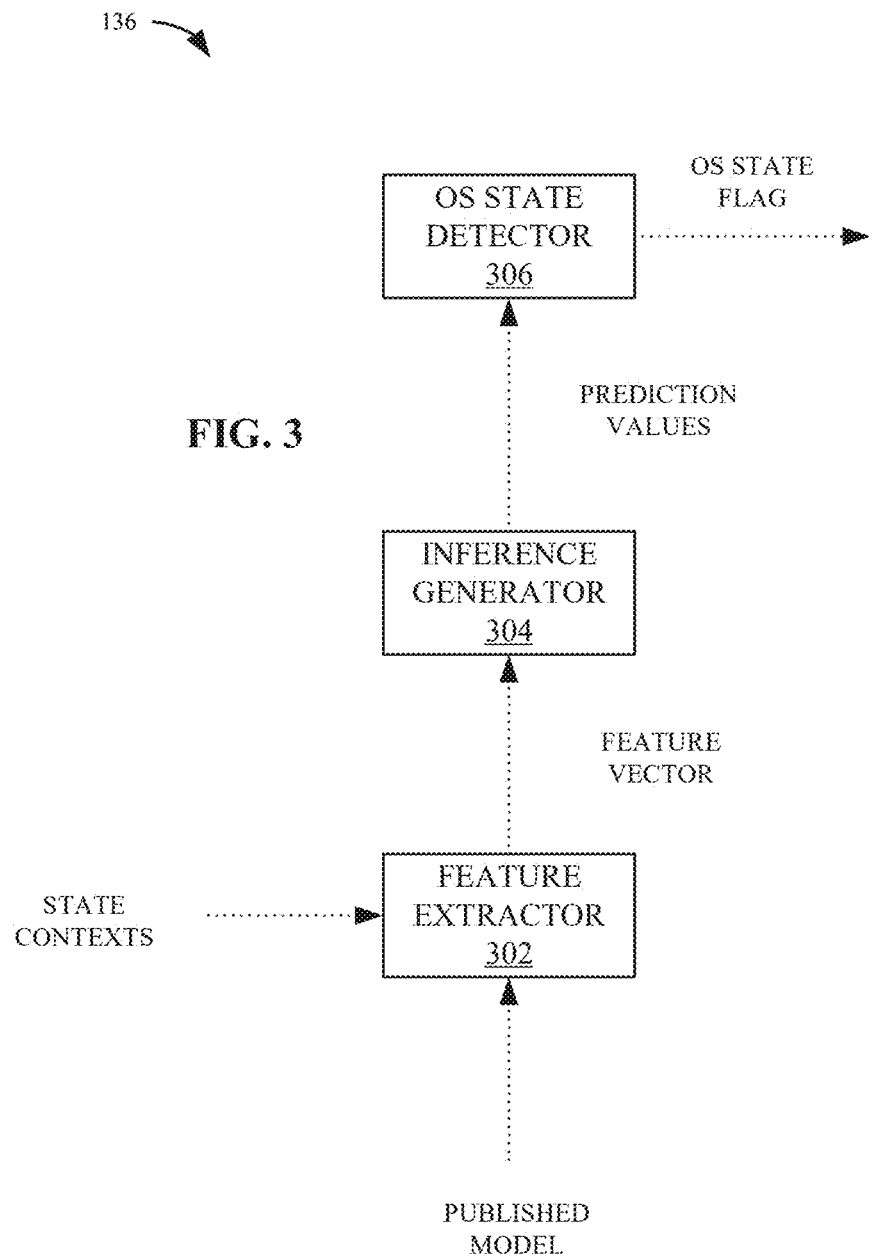
FIG. 3 is a block diagram of an example prediction controller of FIG. 1A to generate a prediction of a future OS state in real time.

Turning to FIG. 3, a block diagram of the example prediction controller 136 of FIG. 1A is illustrated to generate a prediction of a future OS state in real time (e.g., the time at which the device 100 is operating and/or not operating). The example prediction controller 136 includes an example feature extractor 302, an example inference generator 304, and an example OS state detector 306. The example prediction controller 136 is in communication with the example device state controller 126 and the example training controller 134 to facilitate detecting OS states of the example device 100.

In FIG. 3, the example prediction controller 136 includes the example feature extractor 302 to extract features of raw state contexts and generate a feature vector to provide to the inference generator 304. For example, the feature extractor 302 operates in a manner similar to the feature extractor 202 of FIG. 2. However, in some examples the feature extractor 302 of FIG. 3 does not extract features of association data because the association data requires the querying of the standby management system 142 of FIG. 1A for OS states at a later time period, and the prediction controller 136 instead predicts and/or guesses the OS state at a later time period rather than waiting. The example feature extractor 302 extracts data of state contexts that have not yet been associated with a future OS state. For example, the feature extractor 302 may receive state contexts from the device state controller 126 and determine the features of the state contexts meet a possible condition corresponding to a respective OS state.

In FIG. 3, the example prediction controller 136 includes the example inference generator 304 to generate a prediction based on a feature vector provided by the example feature extractor 302. For example, the inference generator 304 may generate a probability value indicative of the likelihood that the OS state will be initiated, de-activated, etc., at a future time by utilizing a model that is trained, generated, and or otherwise published by the training controller 134 of FIGS. 1 and 2. For example, the device state controller 126 may retrieve sensor data and measurements of the external environment of the device 100 and the inference generator 304 utilizes the trained model based on the state contexts of the external environment to determine correlations of the state contexts and possible OS states to output a probability value indicative of a likelihood that OS state is going to change in the near future. The example inference generator 304 is updated (e.g., periodically) by the example training controller 134. The prediction values produced by the example inference generator 304 are provided to the example OS state detector 306.

In FIG. 3, the example prediction controller 136 includes the example OS state detector 306 to determine if a future OS state was detected by the inference generator 304. For example, the OS state detector 306 receives, from the inference generator 304, probability values indicative of likelihoods that OS states are going to change. The example OS state detector 306 generates a flag (e.g., sets a bit to 1, clears a bit to 0, stores an "OS state detected" value with a predicted time, etc.) if it determines that the probability values are sufficiently indicative of future OS states. The example prediction controller 306 provides the flag to the example schedule controller 138 of FIG. 1A to notify the example schedule controller 138 that the OS state is about to be initiated by the user and/or is not about to be initiated by the user.

Returning to the example sensor hub 102 of FIG. 1A, the sensor hub 102 enters an inference operation when the example training controller 134 outputs a published model to the example prediction controller 136. The example prediction controller 136 obtains state contexts from the example device state controller 126 and generates an OS state flag based on a prediction made of the state contexts.

The example schedule controller 138 obtains the OS state flag and generates a wake period Tw based on the output OS state flag. In some examples, the schedule controller 138 queries the device event controller 124 for event contexts when an OS state flag is received. For example, the schedule controller 138 requests a placement transition 152 and/or a user presence transition 154 from the device event controller 124. In response to the query, the example device event controller 124 determines the placement transition 152 and user presence transition 154 based on measurements and data from the example sensors 104.

For example, the device event controller 124 determines whether the device 100 has been removed from a bag, place in a bag, place on a table, etc., (e.g., placement transition 154) based on measurements from the example accelerometer 108, the example proximity sensor 112, and/or the example ambient light sensor 114. For example, the device event controller 124 monitors changes in motion, light, and proximity caused by transitions between in-bag and out-of-bag movements. In another example, the device event controller 124 determines whether a user is approaching the device 100, is moving away from the device 100, is located at the device 100, etc., (e.g., user presence transition 154) based on measurements from the proximity sensor 112, the vision sensor 118, the radar sensor 120, and/or the ultrasonic sensor 122. For example, the device event controller 124 utilizes object detection and recognition methods to detect long range and/or short range user presence.

The example schedule controller 138 obtains the event contexts from the example device event controller 124 and determines the wake period Tw based on a combination of the event contexts and the OS state flag. For example, the schedule controller 138 may determine that an OS state will be activated in 30 minutes, based on the OS state flag. In such an example, the schedule controller 138 may determine that a wake trigger may be beneficial 5 minutes prior to the predicted activation time. Therefore, the schedule controller 138 may set the wake period Tw to be 25 minutes. However, in such an example, if the event contexts are indicative that a transition has occurred, the example schedule controller 138 may generate a wake period Tw based on the transition. For example, when a user becomes present, the schedule controller 138 may override the wake period Tw of 25 minutes and immediately initiate a wake trigger to the standby management system 142. In such an example, user presence indicates the user intends to immediately activate the device 100, therefore the schedule controller 138 acts to ready the device 100 (e.g., wake applications to sync emails, updates, calendars, etc.) in a timely manner.

When the example schedule controller 138 sets the wake period Tw, the example schedule controller 138 initiates the example wake timer 140. For example, the wake timer 140 waits for the wake period Tw to complete (e.g., wait for 25 minutes to perform an action). When the example wake timer 140 completes the wake period Tw, the example wake timer 140 sends a wake event trigger to the example standby management system 142. The example standby management system 142 goes into a wake mode to provide enough power to the hardware components of the example host 106 for syncing, updating, an readying the example device 100.

The example inference operation of the example sensor hub 102 repeats continuously throughout the lifetime of the device 100. The inference operation is updated periodically and/or aperiodically when the example prediction controller 136 obtains updated and/or new models from the example training controller 134. Over time, the inferring phase increases in accuracy as the example training controller 134 learns the user behavior patterns.

While an example manner of implementing the sensor hub 102 of FIG. 1A is illustrated in FIGS. 1-3, one or more of the elements, processes and/or devices illustrated in FIGS. 1-3 may be combined, divided, re-arranged, omitted, eliminated and/or implemented in any other way. Further, the example device event controller 124, the example device state controller 126, the example buffer 128, the example timer 130, the example associator 132, the example training controller 134, the example prediction controller 136, the example schedule controller 138, the example wake timer 140, the example feature extractor 202, the example model trainer 204, the example model updater 206, the example model generator 208, the example feature extractor 302, the example inference generator 304, the example OS state detector 306, and/or, more generally, the example sensor hub 102 of FIG. 1A may be implemented by hardware, software, firmware and/or any combination of hardware, software and/or firmware. Thus, for example, any of the example device event controller 124, the example device state controller 126, the example buffer 128, the example timer 130, the example associator 132, the example training controller 134, the example prediction controller 136, the example schedule controller 138, the example wake timer 140, the example feature extractor 202, the example model trainer 204, the example model updater 206, the example model generator 208, the example feature extractor 302, the example inference generator 304, the example OS state detector 306, and/or, more generally, the example sensor hub 102 of FIG. 1A could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example device event controller 124, the example device state controller 126, the example buffer 128, the example timer 130, the example associator 132, the example training controller 134, the example prediction controller 136, the example schedule controller 138, the example wake timer 140, the example feature extractor 202, the example model trainer 204, the example model updater 206, the example model generator 208, the example feature extractor 302, the example inference generator 304, and/or the example OS state detector 306 is/are hereby expressly defined to include a non-transitory computer readable storage device or storage disk such as a memory, a digital versatile disk (DVD), a compact disk (CD), a Blu-ray disk, etc. including the software and/or firmware. Further still, the example sensor hub 102 of FIG. 1A may include one or more elements, processes and/or devices in addition to, or instead of, those illustrated in FIGS. 1-3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
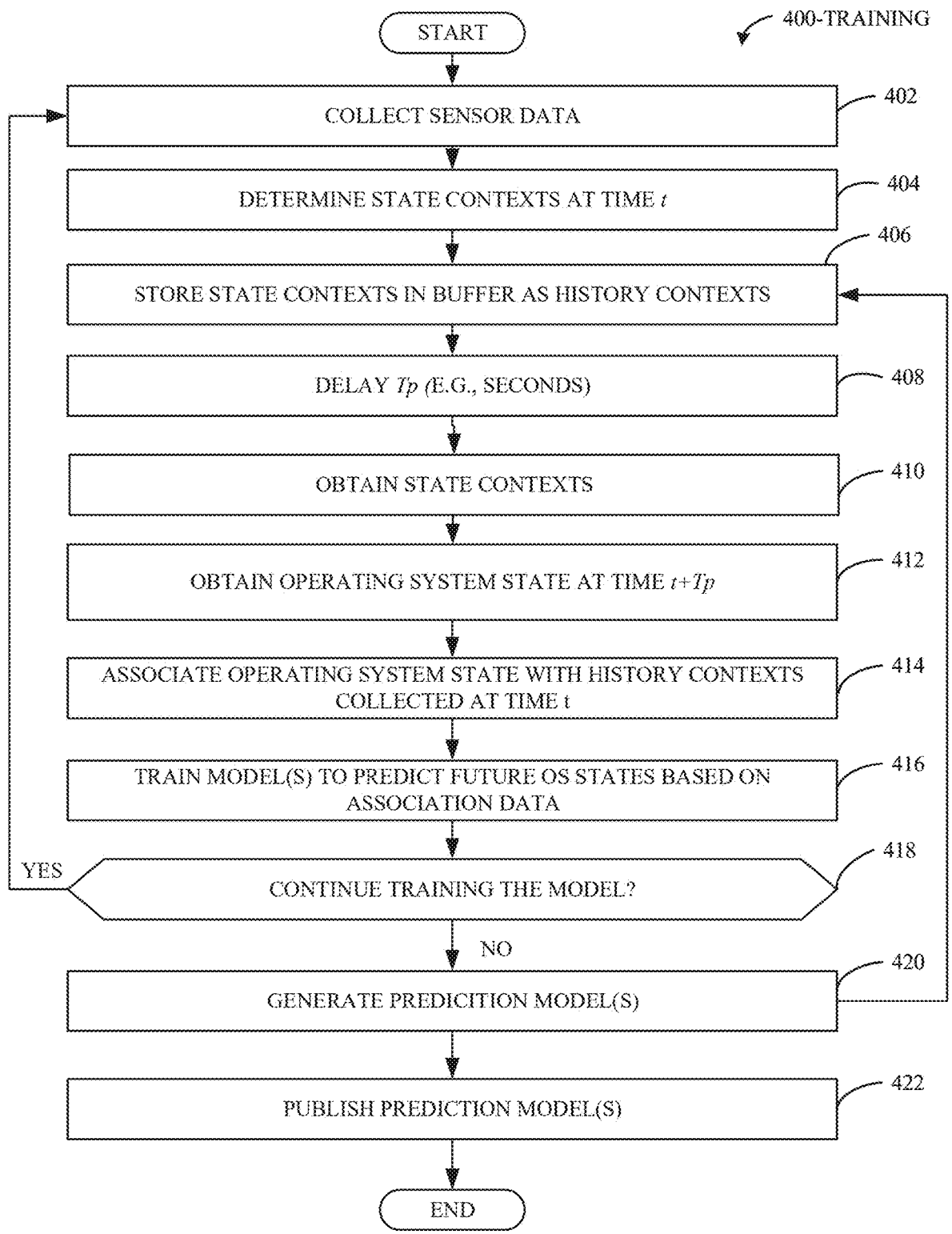
FIG. 4 is a flowchart representative of machine readable instructions which may be executed to implement an example sensor hub of FIG. 1A to train a prediction model.
Figure 5:
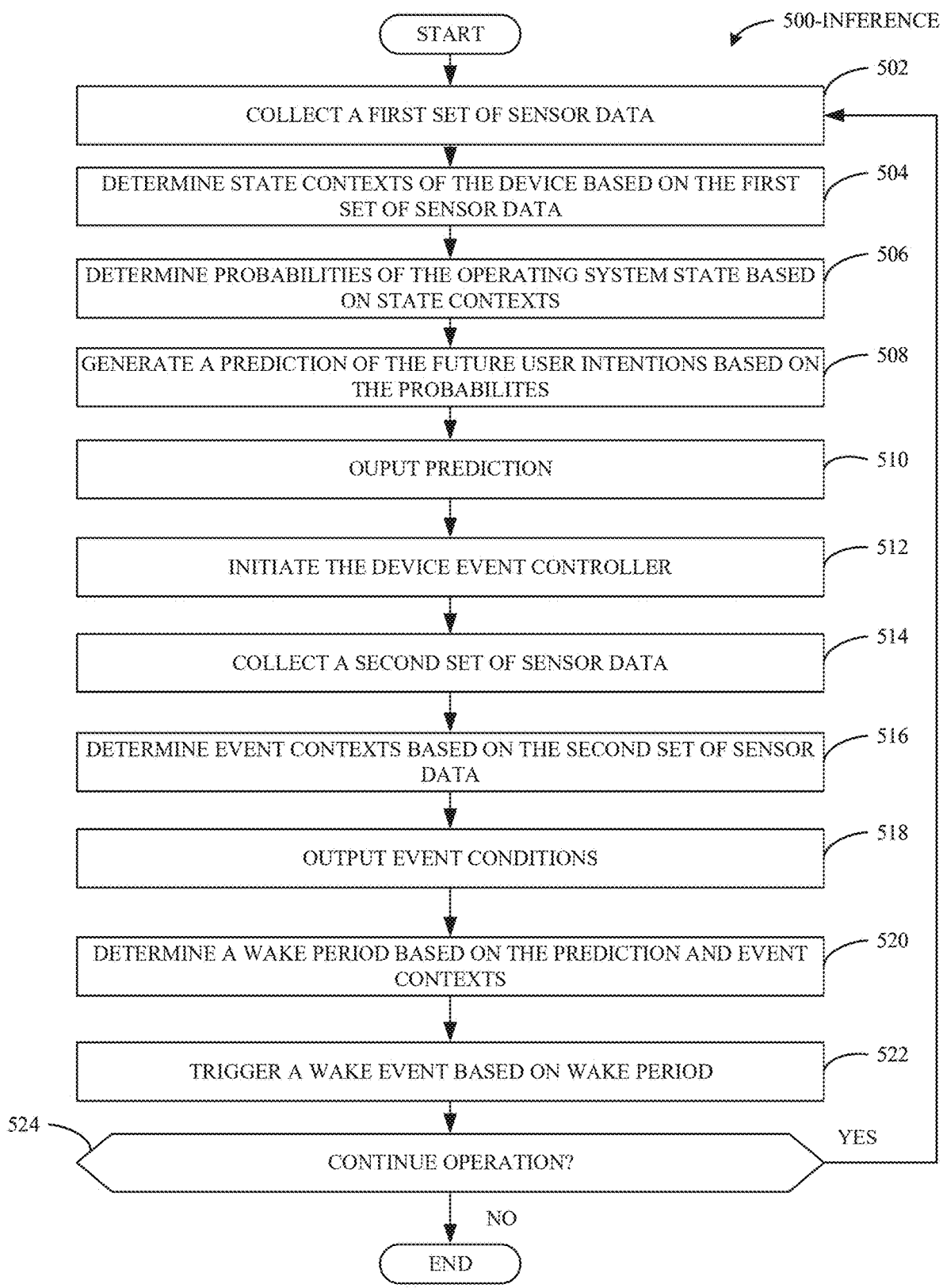
FIG. 5 is a flowchart representative of machine readable instructions which may be executed to implement an example sensor hub of FIG. 1A to generate a prediction.

Flowcharts representative of example hardware logic, machine readable instructions, hardware implemented state machines, and/or any combination thereof for implementing the sensor hub 102 of FIGS. 1-3 are shown in FIGS. 4 and 5. The machine readable instructions may be one or more executable programs or portion(s) of an executable program for execution by a computer processor and/or processor circuitry, such as the processor 612 shown in the example processor platform 600 discussed below in connection with FIG. 6. The programs may be embodied in software stored on a non-transitory computer readable storage medium such as a CD-ROM, a floppy disk, a hard drive, a DVD, a Blu-ray disk, or a memory associated with the processor 612, but the programs and/or parts thereof could alternatively be executed by a device other than the processor 612 and/or embodied in firmware or dedicated hardware. Further, although the example programs are described with reference to the flowcharts illustrated in FIGS. 4 and 5, many other methods of implementing the example sensor hub 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4 and 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 illustrates an example training operation 400 of the example sensor hub 102 of FIG. 1A to train one or more model(s) to predict future OS states of the example device 100 of FIG. 1A (e.g., based on state contexts). At block 402, the example device state controller 126 of FIG. 1A collects sensor data. For example, the device state controller 126 obtains measurements and information from the example sensors 104 of FIG. 1A.

The example device state controller 126 determines state contexts (e.g., first, second, third, and fourth) at time t (block 404). For example, the device state controller 126 determines user activity data 144 at time t, lid mode data 146 at time t, location data 148 at time t, and device motion data 150 at time t based on measurements obtained from the sensors 104. The example device state controller 126 stores the state contexts in the buffer 128 as history contexts (block 406). For example, any data stored in the buffer 128 is utilized and/or retrieved at a later time period (Tp), thus causing the data to be historical.

The example timer 130 delays Tp seconds (block 408). For example, the timer 130 counts to a maximum predictable time, Tp, wherein the maximum predictable time delays the associator 132 of FIG. 1A from obtaining the state contexts. Then, the example associator 132 obtains state contexts (block 410). For example, the associator 132 queries the buffer 128 for the state contexts in response to the timer 130 completing the delay or the buffer 128 releases the state contexts in response to the timer 130 completing the delay.

The example associator 132 obtains an operating system state at time t+Tp (block 412). For example, the associator 132 queries the host 106 and/or the standby management system 142 for the status of the operating system (e.g., active, inactive, etc.). Upon obtaining the OS state at time t+Tp, the example associator 132 associates the OS state with history contexts collected at time t (block 414). For example, the associator 132 stores conditions in memory that indicate the state contexts of time t correspond to the OS state at time t+Tp. In such an example, the associator 132 generates one or more histograms (e.g., 160, 162, 164) to represent the conditions and outputs the histograms (e.g., 160, 162, 164) to the example training controller 134.

The example training controller 134 trains a model to predict future OS states based on association data (block 414). For example, the training controller 134 extracts features from the histograms (e.g., association data) that correspond to state contexts and future OS states to generate feature vectors and then trains and/or builds a model to represent a pattern in identified in the feature vectors. In some examples, the training controller 134 and/or more specifically the model trainer 204, utilizes state contexts to determine posterior probabilities of the future OS states given the state contexts. For example, the training controller 134 utilizes Equations 1-3 above to determine posterior probabilities of future OS states. In some examples, the probabilities correspond to patterns in user behavior. For example, the patterns correspond to user behavior patterns over one or more periods of time (e.g., 24 hours, five days, seven days, etc.). For example, the pattern(s) represent what times of the day the user activates the OS, what the user is doing when the user is and is not using the device 100, where the device 100 is located when it is activated versus deactivated, etc.

The example training controller 134 determines whether to continue training the model (block 418). For example, the training controller 134 determines if a sufficient (e.g., a threshold error metric is satisfied) amount of error has been achieved, if new association data still needs to be obtained, etc. In some examples, the training controller 134 generates a posterior probability of a future OS state and determines if the probability matches the known state of the OS. For example, the training controller 134 determines a match if the posterior probability is within an acceptable amount of error from a known state. If the example training controller 134 determines the training is to continue (e.g., block 418 returns a value YES), control returns to block 402.

If the example training controller 134 determines the training is not to continue (e.g., block 418 returns a value NO), the example training controller generates the prediction model(s) (block 420). For example, the model generator 208 of FIG. 2 may receive a notification from the model updater 206 that a new and/or updated model has been trained and the model generator 208 may create files including the prediction model(s).

The example training controller 134 publishes the prediction model(s) (block 422). For example, the model generator 208 creates the file in which the prediction model(s) is/are published so that the prediction model(s) can be saved and/or stored as the file. In some examples, the model generator 208 provides a notification to the prediction controller 136 that one or more model(s) is/are ready to be transformed and published.

The example training operation 400 ends when the model is published, but may be repeated when the prediction model is updated with newly identified patterns from new association data.

Turning to FIG. 5, an example inference operation 500 is illustrated to predict an OS state in real time and generate an appropriate wake period based on the prediction. At block 502, the example device state controller 126 collects a first set of sensor data. For example, the device state controller 126 collects measurements from the sensors 104 corresponding to state contexts (e.g., user activity data 144, lid mode data 146, location data 148, and device motion data 150).

The example device state controller 126 determines state contexts (e.g., first, second, third, and fourth) of the device 100 based on the first set of sensor data (block 504). For example, the device state controller 126 identifies the status of user activity data 144, the status of lid mode data 146, the status of device location data 148, and the status of device motion data 150 based on a plurality of sensor measurements. The example device state controller 126 outputs the state contexts to the example prediction controller 136.

The example prediction controller 136 determines probabilities of the operating system state based on the state contexts (block 506). For example, the prediction controller 136 utilizes the prediction model to identify a future OS state based on the state contexts. In such an example, the feature extractor 302 of FIG. 3 extracts features from the state contexts to generate feature vectors indicative of conditions and the inference generator 304 of FIG. 3 generates a likelihood that the OS state will be active and/or inactive at a particular time based on the feature vectors.

The example prediction controller 136 outputs the prediction (block 510). For example, the prediction controller 136 provides the likelihoods and probabilities to the schedule controller 138 of FIG. 1A. The example schedule controller 138 initiates the example device event controller 124 (block 512). For example, the schedule controller 138 initiates the example device event controller 124 in response to obtaining the prediction. The example, device event controller 124 collects a second set of sensor data (block 514). For example, the device event controller 124 collects measurements from the sensors 104 corresponding to the events and/or transitions of the environment of the device 100.

The example device event controller 124 determines event contexts (e.g., first and second) based on the second set of sensor data (block 516). For example, the device event controller 124 determines a status of user presence 152 and a status of placement transition 154 based on the second set of sensor data. The second set of sensor data can be from any one of the example sensors 104. The example device event controller 124 outputs the event contexts (block 518). For example, the device event controller 124 provides the current status of user presence 152 and placement transition 154 to the schedule controller 138.

The example schedule controller 138 determines a wake period based on the prediction and event contexts (block 520). For example, the schedule controller 138 determines a length of time from the current time to trigger a wake event based on the prediction and event contexts. In such an example, the schedule controller 138 analyzes the prediction to determine if the OS state will be activated by the user within a certain amount of time and additionally analyzes the event contexts to determine if an override of the prediction is to occur. The example schedule controller 138 sets the wake period Tw and notifies the wake timer 140 of FIG. 1A to initialize (e.g., set) the wake period Tw.

The example wake timer 140 triggers a wake event based on the wake period (block 522). For example, the wake timer 140 sends a wake event to the standby management system 142 of FIG. 1A at the time indicated by the wake period Tw. The wake event causes the example standby management system 142 to provide enough power to the host 106 to ready the device 100 for use by the user.

The example sensor hub 102 and/or more specifically the example prediction controller 136 determines if the operation is to continue (block 524). For example, the prediction controller 136 determines if new sensor readings are provided, if the device state controller 126 generated new state contexts, etc. If the example prediction controller 136 determines operation is to continue (e.g., block 524 returns a value YES), control returns to block 502). If the example prediction controller 136 determines operation is not to continue (e.g., block 524 returns a value NO), the example inference operation 500 ends. The example inference operation 500 may be repeated when a new prediction model is obtained, when new sensor reads are obtained, when new state contexts are generated, etc.

Figure 6:
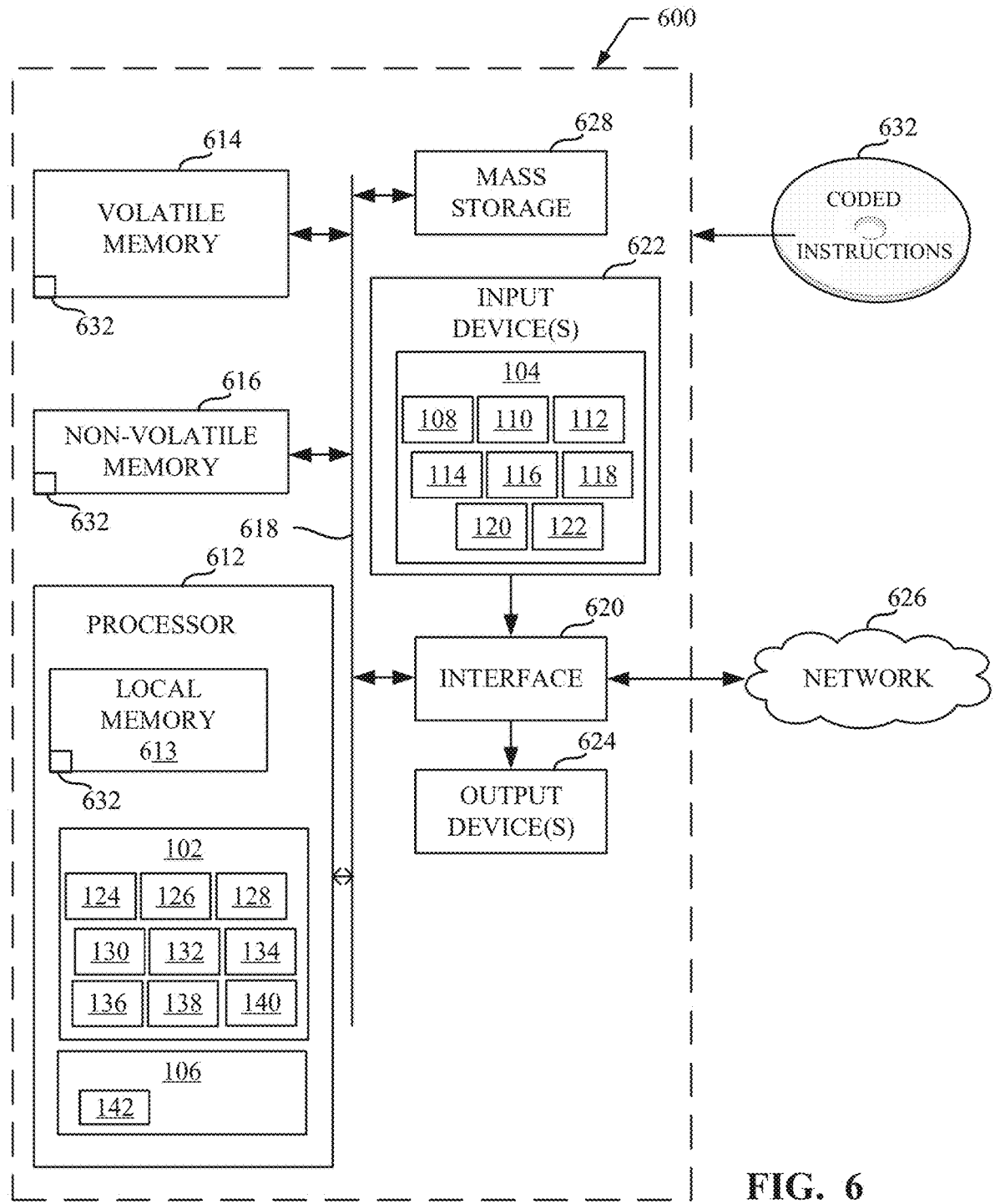
FIG. 6 is a block diagram of an example processing platform structured to execute the instructions of FIGS. 4 and 5 to implement the example device of FIGS. 1A and 2.

FIG. 6 is a block diagram of an example processor platform 600 structured to execute the instructions of FIGS. 4 and 5 to implement the sensor hub 102 of FIGS. 1-3. The processor platform 600 can be, for example, a server, a personal computer, a workstation, a self-learning machine (e.g., a neural network), a mobile device (e.g., a cell phone, a smart phone, a tablet such as an iPad™), an Internet appliance, a gaming console, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor hub 102, the example host 106, the example device event controller 124, the example device state controller 126, the example buffer 128, the example timer 130, the example associator 132, the example training controller 134, the example prediction controller 136, the example schedule controller 138, the example wake timer 140, and the example standby management system 142.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint, a voice recognition system, the example accelerometer 108, the example gyroscope 110, the example proximity sensor 112, the example ambient light 114, the example Wi-Fi 116, the example vision sensor 118, the example radar sensor 120, and/or the example ultrasonic sensor 122.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), and/or an in-place switching (IPS) display, a touchscreen, etc.). The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 4 and 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus, systems, and articles of manufacture have been disclosed that determine different times to wake and ready a device for a user based on state and event contexts. Disclosed methods, apparatus, systems, and articles of manufacture disclosed herein improve the efficiency of using a computing device by reducing unnecessary wake events that cause the computing device to activate in an effort to save power consumption. Disclosed methods, apparatus and articles of manufacture are accordingly directed to one or more improvement(s) in the functioning of a computer.

Example methods, apparatus, systems, and articles of manufacture to dynamically schedule a wake pattern in a computing system are disclosed herein. Further examples and combinations thereof include the following:

Example 1 includes an apparatus comprising a device state controller to determine contexts of a device based on sensor measurements collected at a first time, an associator to associate a state of an operating system with the contexts of the device, the state obtained at a second time after the first time, a training controller to generate a prediction model based on the association, the prediction model to predict a third time when the state of the operating system will be active based on the contexts, and a schedule controller to reduce power consumption of the device by triggering a wake event before the third time, the wake event to prepare the device for exiting an inactive state.

Example 2 includes the apparatus of example 1, wherein the device state controller is to determine activity of a user of the device based on sensor measurements, the sensor measurements corresponding to a lid mode of the device based on the sensor measurements, a location of the device based on the sensor measurements, and a motion of the device based on the sensor measurements.

Example 3 includes the apparatus of example 1, further including a buffer to store the contexts for a predetermined period of time, the predetermined period of time corresponding to a maximum predictable time.

Example 4 includes the apparatus of example 3, wherein the maximum predictable time corresponds to a time period between the first time of the sensor measurements and the second time of the state of the operating system.

Example 5 includes the apparatus of example 1, wherein the associator is to generate a first histogram corresponding to a frequency of the contexts in first time bins over a time period, a second histogram corresponding to a frequency of the state of the operating system in second time bins over the time period, and a third histogram corresponding to an association between frequency of the contexts in the first time bins and the frequency of the state of the operating system in the second time bins throughout the time period.

Example 6 includes the apparatus of example 5, wherein the training controller is to derive predictions about an inactive state and an active state of the operating system throughout the time period from the first, second, and third histograms.

Example 7 includes the apparatus of example 1, wherein the associator is to query a standby management system for the state of the operating system in response to obtaining the contexts, the query to occur at a predetermined period of time after the first time of the contexts.

Example 8 includes a non-transitory computer readable storage medium comprising instructions that, when executed, cause one or more processors to at least determine contexts of a device based on sensor measurements collected at a first time, associate a state of an operating system with the contexts of the device, the state obtained at a second time after the first time, generate a prediction model based on the association, the prediction model to predict a third time when the state of the operating system will be active based on the contexts, and reduce power consumption of the device by triggering a wake event before the third time, the wake event to prepare the device for exiting an inactive state.

Example 9 includes the non-transitory computer readable storage medium of example 8, wherein the instructions, when executed, cause the one or more processors to determine activity of a user of the device based on sensor measurements, the sensor measurements corresponding to a lid mode of the device based on the sensor measurements, a location of the device based on the sensor measurements, and a motion of the device based on the sensor measurements.

Example 10 includes the non-transitory computer readable storage medium of example 8, wherein the instructions, when executed, cause the one or more processors to store the contexts for a predetermined period of time, the predetermined period of time corresponding to a maximum predictable time.

Example 11 includes the non-transitory computer readable storage medium of example 8, wherein the instructions, when executed, cause the one or more processors to generate a first histogram corresponding to a frequency of the contexts in first time bins over a time period, a second histogram corresponding to a frequency of the state of the operating system in second time bins over the time period, and a third histogram corresponding to an association between frequency of the contexts in the first time bins and the frequency of the state of the operating system in the second time bins throughout the time period.

Example 12 includes the non-transitory computer readable storage medium of example 11, wherein the instructions, when executed, cause the one or more processors to derive predictions about an inactive state and an active state of the operating system throughout the time period from the first, second, and third histograms.

Example 13 includes the non-transitory computer readable storage medium of example 8, wherein the instructions, when executed, cause the one or more processors to query a standby management system for the state of the operating system in response to obtaining the contexts, the query to occur at a predetermined period of time after the first time of the contexts.

Example 14 includes a method comprising determining contexts of a device based on sensor measurements collected at a first time, the contexts corresponding to, associating a state of an operating system with the contexts of the device, the state obtained at a second time after the first time, generating a prediction model based on the association, the prediction model to predict a third time when the state of the operating system will be active based on the contexts, and reducing power consumption of the device by triggering a wake event before the third time, the wake event to prepare the device for exiting an inactive state.

Example 15 includes the method of example 14, further including determining activity of a user of the device based on sensor measurements, the sensor measurements corresponding to a lid mode of the device based on the sensor measurements, a location of the device based on the sensor measurements, and a motion of the device based on the sensor measurements.

Example 16 includes the method of example 14, further including storing the contexts for a predetermined period of time, the predetermined period of time corresponding to a maximum predictable time.

Example 17 includes the method of example 16, wherein the maximum predictable time corresponds to a time period between the first time of the sensor measurements and the second time of the state of the operating system.

Example 18 includes the method of example 14, further including generating a first histogram corresponding to a frequency of the contexts in first time bins over a time period, a second histogram corresponding to a frequency of the state of the operating system in second time bins over the time period, and a third histogram corresponding to an association between frequency of the contexts in the first time bins and the frequency of the state of the operating system in the second time bins throughout the time period.

Example 19 includes the method of example 18, further including deriving predictions about an inactive state and an active state of the operating system throughout the time period from the first, second, and third histograms.

Example 20 includes the method of example 14, further including querying a standby management system for the state of the operating system in response to obtaining the contexts, the query to occur at a predetermined period of time after the first time of the contexts.

Example 21 includes an apparatus comprising means for determining contexts of a device based on sensor measurements collected at a first time, means for associating a state of an operating system with the contexts, the state obtained at a second time after the first time, means for generating a prediction model based on the association, the prediction model to predict a third time when the state of the operating system will be active based on the contexts, and means for scheduling to reduce power consumption of the device by triggering a wake event before the third time, the wake event to prepare the device for exiting an inactive state.

Example 22 includes the apparatus of example 21, wherein the means for determining is to determine activity of a user of the device based on sensor measurements, the sensor measurements corresponding to a lid mode of the device based on the sensor measurements, a location of the device based on the sensor measurements, and a motion of the device based on the sensor measurements.

Example 23 includes the apparatus of example 21, further include a means for storing the contexts for a predetermined period of time, the predetermined period of time corresponding to a maximum predictable time.

Example 24 includes the apparatus of example 23, wherein the means for storing is determine a time period between the first time of the sensor measurements and the second time of the state of the operating system to determine the maximum predictable time.

Example 25 includes the apparatus of example 21, wherein the means for associating is to generate a first histogram corresponding to a frequency of the contexts in first time bins over a time period, a second histogram corresponding to a frequency of the state of the operating system in second time bins over the time period, and a third histogram corresponding to an association between frequency of the contexts in the first time bins and the frequency of the state of the operating system in the second time bins throughout the time period.

Example 26 includes the apparatus of example 25, wherein the means for generating is to derive predictions about an inactive state and an active state of the operating system throughout the time period from the first, second, and third histograms.

Example 27 includes an apparatus comprising a prediction controller to determine, utilizing a trained model, a probability of an active state of an operating system based on state contexts, and generate a prediction of a future user intention based on the probability, and a schedule controller to determine a wake period to activate the operating system based on the prediction and a first and second event context.

Example 28 includes the apparatus of example 27, further including a device state controller to collect sensor measurements corresponding to an external environment of a device that implements the operating system, determine a user activity data based on the sensor measurements, determine a lid mode based on the sensor measurements, determine a location of the device based on the sensor measurements, and determine a device motion data based on the sensor measurements.

Example 29 includes the apparatus of example 27, wherein the schedule controller is to obtain the first and second event contexts corresponding to an event transition of a device implementing the operating system, determine that at least one of the first or second event contexts is indicative of an instant activation of the operating system, and override the prediction of the future user intention to generate an immediate wake period.

Example 30 includes the apparatus of example 27, further including a wake timer to obtain the wake period and initiate a wake event at the wake period to facilitate preparing the operating system for an active operation.

Example 31 includes the apparatus of example 30, wherein the wake timer is to complete a wait operation when the wake period expires.

Example 32 includes the apparatus of example 27, wherein the prediction controller is to extract features of the contexts corresponding to a condition of a state of the operating system, generate a feature vector to represent the features of the state contexts, and input the feature vector to the trained model to generate a first likelihood that the state of the operating system will be initiated at a future time, a second likelihood that the state of the operating system will be de-activated at the future time, and a third likelihood that the state of the operating system will not change at the future time.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   machine readable instructions; and
   at least one processor circuit to be programmed by the machine readable instructions to:
   generate a first histogram corresponding to a frequency of at least one context of a device based on first sensor measurements collected over a time period;
   generate a second histogram corresponding to a frequency of a state of an operating system over the time period;

generate a third histogram corresponding to an association of (a) the frequency of the at least one context of the device and (b) the frequency of the state of the operating system over the time period; and generate a prediction model based on the association, the prediction model to predict times when the state of the operating system will be one of in an active state or an inactive state based on the at least one context, the prediction model to cause transmission of a wake event trigger to the device based on the predicted times corresponding to the active state.

2. The apparatus of claim 1, wherein one or more of the at least one processor circuit is to determine activity of a user of the device based on at least one of a lid mode of the device, a location of the device, or a motion of the device.

3. The apparatus of claim 1, wherein one or more of the at least one processor circuit is to store the at least one context for a maximum predictable time.

4. The apparatus of claim 3, wherein one or more of the at least one processor circuit is to determine the maximum predictable time based on a duration between (a) a user action and (b) a time corresponding to activation of the operating system.

5. The apparatus of claim 1, wherein one or more of the at least one processor circuit is to query a standby management system for the state of the operating system in response to obtaining the at least one context.

6. At least one non-transitory machine-readable storage medium comprising machine-readable instructions to cause at least one processor circuit to at least:

generate a first histogram corresponding to a frequency of at least one context of a device based on first sensor measurements collected over a time period;

generate a second histogram corresponding to a frequency of a state of an operating system over the time period;

generate a third histogram corresponding to an association of (a) the frequency of the at least one context of the device and (b) the frequency of the state of the operating system over the time period; and generate a prediction model based on the association, the prediction model to predict times when the state of the operating system will be one of in an active state or an inactive state based on the at least one context, the prediction model to cause transmission of a wake event trigger to the device based on the predicted times corresponding to the active state.

7. The at least one non-transitory machine-readable storage medium of claim 6, wherein the machine-readable instructions are to cause one or more of the at least one processor circuit to determine activity of a user of the device based on at least one of a lid mode of the device, a location of the device, or a motion of the device.

8. The at least one non-transitory machine-readable storage medium of claim 6, wherein the machine-readable instructions are to cause one or more of the at least one processor circuit to store the at least one context for a maximum predictable time.

9. The at least one non-transitory machine-readable storage medium of claim 8, wherein the machine-readable instructions are to cause one or more of the at least one processor circuit to determine the maximum predictable time based on a duration between (a) a user action and (b) a time corresponding to activation of the operating system.

10. The at least one non-transitory machine-readable storage medium of claim 6, wherein the machine-readable instructions are to cause one or more of the at least one processor circuit to query a standby management system for the state of the operating system in response to obtaining the at least one context.

11. A method comprising:

generating a first histogram corresponding to a frequency of at least one context of a device based on first sensor measurements collected over a time period;

generating a second histogram corresponding to a frequency of a state of an operating system over the time period;

generating a third histogram corresponding to an association of (a) the frequency of the at least one context of the device and (b) the frequency of the state of the operating system over the time period; and generating, by at least one processor circuit programmed by at least one instruction, a prediction model based on the association, the prediction model to predict times when the state of the operating system will be one of in an active state or an inactive state based on the at least one context, the prediction model to cause transmission of a wake event trigger to the device based on the predicted times corresponding to the active state.

12. The method of claim 11, further including determining activity of a user of the device based on at least one of a lid mode of the device, a location of the device, or a motion of the device.

13. The method of claim 11, further including storing the at least one context for a predetermined period of time, the predetermined period of time corresponding to a maximum predictable time.

14. The method of claim 13, further including determining the maximum predictable time based on a duration between (a) a user action and (b) a time corresponding to activation of the operating system.

15. The method of claim 11, further including querying a standby management system for the state of the operating system in response to obtaining the at least one context, the query to occur at a predetermined period of time after the first time.

* * * * *